United States Patent
Huang et al.

(10) Patent No.: US 12,283,087 B2
(45) Date of Patent: Apr. 22, 2025

(54) MODEL TRAINING METHOD, MEDIA INFORMATION SYNTHESIS METHOD, AND RELATED APPARATUSES

(71) Applicant: TENCENT TECHNOLOGY (SHENZHEN) COMPANY LIMITED, Shenzhen (CN)

(72) Inventors: Haozhi Huang, Shenzhen (CN); Jiawei Li, Shenzhen (CN); Li Shen, Shenzhen (CN); Yonggen Ling, Shenzhen (CN); Wei Liu, Shenzhen (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1177 days.

(21) Appl. No.: 17/109,072

(22) Filed: Dec. 1, 2020

(65) Prior Publication Data
US 2021/0152751 A1    May 20, 2021

Related U.S. Application Data

(63) Continuation of application No. PCT/CN2020/113118, filed on Sep. 3, 2020.

(30) Foreign Application Priority Data

Nov. 19, 2019  (CN) .......................... 201911140015.7

(51) Int. Cl.
*G06N 20/00*    (2019.01)
*G06F 18/21*    (2023.01)
(Continued)

(52) U.S. Cl.
CPC ........ *G06V 10/764* (2022.01); *G06F 18/2148* (2023.01); *G06F 18/217* (2023.01);
(Continued)

(58) Field of Classification Search
CPC .. G06V 10/764; G06V 10/7747; G06V 40/10; G06V 40/171; G06F 18/2148; G06F 18/217; H04N 5/265
See application file for complete search history.

(56) References Cited

U.S. PATENT DOCUMENTS 8,406,566 B1   3/2013  Wilensky et al.
2007/0183679 A1*  8/2007  Moroto ................ H04N 1/3871
                                                382/284
(Continued)

FOREIGN PATENT DOCUMENTS

CN    108229348 A    6/2018
CN    109377445 A    2/2019
(Continued)

OTHER PUBLICATIONS

The World Intellectual Property Organization (WIPO) International Search Report for PCT/CN2020/113118 Dec. 4, 2020 8 Pages (including translation).
(Continued)

*Primary Examiner* — Tamara T Kyle
*Assistant Examiner* — William Wong
(74) *Attorney, Agent, or Firm* — ANOVA LAW GROUP, PLLC

(57) ABSTRACT

A model training method includes obtaining an image sample set and brief-prompt information; generating a content mask set according to the image sample set and the brief-prompt information; generating a to-be-trained image set according to the content mask set; obtaining, based on the image sample set and the to-be-trained image set, a predicted image set through a to-be-trained information synthesis model, the predicted image set comprising at least one predicted image, the predicted image being in correspondence to the image sample; and training, based on the predicted image set and the image sample set, the to-be-
(Continued)

trained information synthesis model by using a target loss function, to obtain an information synthesis model.

17 Claims, 9 Drawing Sheets

(51) Int. Cl.
    *G06F 18/214* (2023.01)
    *G06V 10/764* (2022.01)
    *G06V 10/774* (2022.01)
    *G06V 40/10* (2022.01)
    *G06V 40/16* (2022.01)
    *H04N 5/265* (2006.01)

(52) U.S. Cl.
    CPC ......... *G06N 20/00* (2019.01); *G06V 10/7747* (2022.01); *G06V 40/10* (2022.01); *G06V 40/171* (2022.01); *H04N 5/265* (2013.01)

(56) References Cited

U.S. PATENT DOCUMENTS

| | | | |
|---|---|---|---|
| 2009/0263038 A1* | 10/2009 | Luo | G06F 18/23213 382/254 |
| 2013/0044958 A1* | 2/2013 | Brandt | G06V 40/165 382/201 |
| 2016/0073040 A1* | 3/2016 | Jen | G06F 18/22 348/239 |
| 2018/0122114 A1* | 5/2018 | Luan | H04N 21/44016 |
| 2019/0130215 A1 | 5/2019 | Kaestle et al. | |
| 2019/0141353 A1* | 5/2019 | Michelini | H04N 19/126 |
| 2019/0251401 A1* | 8/2019 | Shechtman | G06V 10/82 |
| 2019/0294871 A1* | 9/2019 | Vaezi Joze | G06V 40/103 |
| 2020/0342646 A1* | 10/2020 | Wang | G06N 3/045 |

FOREIGN PATENT DOCUMENTS

| | | |
|---|---|---|
| CN | 109766868 A | 5/2019 |
| CN | 110070483 A | 7/2019 |
| CN | 110084766 A | 8/2019 |
| CN | 110148102 A | 8/2019 |
| CN | 110852942 A | 2/2020 |

OTHER PUBLICATIONS

The State Intellectual Property Office of the People's Republic of China (SIPO) Office Action 1 for 201911140015.7 Sep. 3, 2020 9 Pages (including translation).

Hyeongwoo Kim et al., "Deep Video Portraits," ACM Transactions on Graphics, 2018. 14 pages.

Yining Li et al., "Dense intrinsic appearance flow for human pose transfer," In Proceedings of CVPR, 2019. 10 pages.

Tero Karra et al., "A Style-based Generator Architecture for Generative Adversarial Networks," In Proceedings of CVPR, 2019. 10 pages.

* cited by examiner

MODEL TRAINING METHOD, MEDIA INFORMATION SYNTHESIS METHOD, AND RELATED APPARATUSES

RELATED APPLICATIONS

This application is a continuation application of PCT Patent Application No. PCT/CN2020/113118, filed on Sep. 3, 2020, which claims priority to Chinese Patent Application No. 201911140015.7, filed with the China National Intellectual Property Administration on Nov. 19, 2019, and entitled "MODEL TRAINING METHOD, MEDIA INFORMATION SYNTHESIS METHOD, AND APPARATUSES." Each of the above applications is incorporated herein by reference in its entirety.

FIELD OF THE TECHNOLOGY

This application relates to the field of artificial intelligence (AI) and, in particular, to model training and media information synthesis.

BACKGROUND

With diversified development of media forms, more and more users start to shoot videos and pictures, or record audio by using mobile terminals, to record their work and life. For a video synthesis scenario, a user may merge the face or the body of a target person into a specified background, and the target person may be seen in the specific background when the video is played.

Currently, a region having a brief prompt may be directly generated by using brief prompt information of the face of the target person, or by using brief prompt information of the body part. The brief prompt usually comes from a rendering result, a texture image, key point coordinates, or the like of the human face or the human body. Finally, the region having the brief prompt is spliced with the background, to obtain a synthesized video having the target person.

However, such approach often cause defects of the synthesized video by the splicing. The disclosed methods and systems are directed to solve one or more problems set forth above and other problems.

SUMMARY

Embodiments of the present disclosure provide a model training method, a media information synthesis method, and related apparatuses, so that defects caused by splicing are avoided, thereby improving the reality feel of the synthesized video.

In view of this, one aspect of the present disclosure provides a model training method. The method includes obtaining an image sample set and brief-prompt information, the image sample set comprising at least one image sample, the brief-prompt information being used for representing key-point information of a to-be-trained object in the image sample. The method also includes generating a content mask set according to the image sample set and the brief-prompt information, the content mask set comprising at least one content mask, the content mask being obtained by extending outward a region identified according to the brief-prompt information in the image sample. The method also includes generating a to-be-trained image set according to the content mask set, the to-be-trained image set comprising at least one to-be-trained image, the to-be-trained image being in correspondence to the image sample. The method also includes obtaining, based on the image sample set and the to-be-trained image set, a predicted image set through a to-be-trained information synthesis model, the predicted image set comprising at least one predicted image, the predicted image being in correspondence to the image sample; and training, based on the predicted image set and the image sample set, the to-be-trained information synthesis model by using a target loss function, to obtain an information synthesis model.

Another aspect of the present disclosure provides a server. The server includes a memory storing computer program instructions, and a processor coupled to the memory. When executing the computer program instructions, the processor is configured to perform: obtaining an image sample set and brief-prompt information, the image sample set comprising at least one image sample, the brief-prompt information being used for representing key-point information of a to-be-trained object in the image sample; generating a content mask set according to the image sample set and the brief-prompt information, the content mask set comprising at least one content mask, the content mask being obtained by extending outward a region identified according to the brief-prompt information in the image sample; generating a to-be-trained image set according to the content mask set, the to-be-trained image set comprising at least one to-be-trained image, the to-be-trained image being in correspondence to the image sample; obtaining, based on the image sample set and the to-be-trained image set, a predicted image set through a to-be-trained information synthesis model, the predicted image set comprising at least one predicted image, the predicted image being in correspondence to the image sample; and training, based on the predicted image set and the image sample set, the to-be-trained information synthesis model by using a target loss function, to obtain an information synthesis model.

Another aspect of this application provides a non-transitory computer-readable storage medium, the storage medium being configured to store a computer program, the computer program being configured to perform the methods according to the foregoing aspects.

Other aspects of the present disclosure can be understood by those skilled in the art in light of the description, the claims, and the drawings of the present disclosure.

DESCRIPTION OF EMBODIMENTS

Embodiments of the present disclosure provide a model training method, a media information synthesis method, and related apparatuses. A to-be-trained image can be generated by using a content mask, and a coverage of the content mask is greater than a range of a to-be-trained object. Therefore, a part between the image content and the background can be generated by an information synthesis model by expanding the boundary appropriately, which avoids defects caused by splicing, thereby improving the reality of the synthesized video.

In the specification, claims, and accompanying drawings of the present disclosure, the terms "first", "second", "third", "fourth", and so on (if existing) are intended to distinguish between similar objects rather than describe a specific order or sequence. It may be understood that the data termed in such a way is interchangeable in proper circumstances, so that the embodiments of the present disclosure described herein for example, can be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is understood that, the embodiments of the present disclosure are applicable to various scenarios in which image splicing or video splicing is required. Specifically, for example, in some news broadcast or weather broadcast, a host is arranged into a virtual scenario, that is, the host and a virtual background need to be spliced together. There are differences between the host and the virtual background, and consequently, the synthesized video looks relatively unreal. In another example, in some movies or television dramas, some pictures are taken based on a virtual scenario, and then actors and the virtual scenario need to be spliced together subsequently. There are relatively obvious border differences between the actors and the virtual scenario, and consequently, the synthesized video looks relatively unreal. In another example, some image applications may provide functions of image matting and synthesizing image matting content with another image, and technically, a matted part in an image needs to be synthesized with a background of another image. However, there are splicing defects between the matted part and the background part generally, and therefore, in each of the foregoing scenarios, there is a solution with smaller splicing defects. Examples of the application scenario of the present disclosure are not shown herein.

Figure 1:
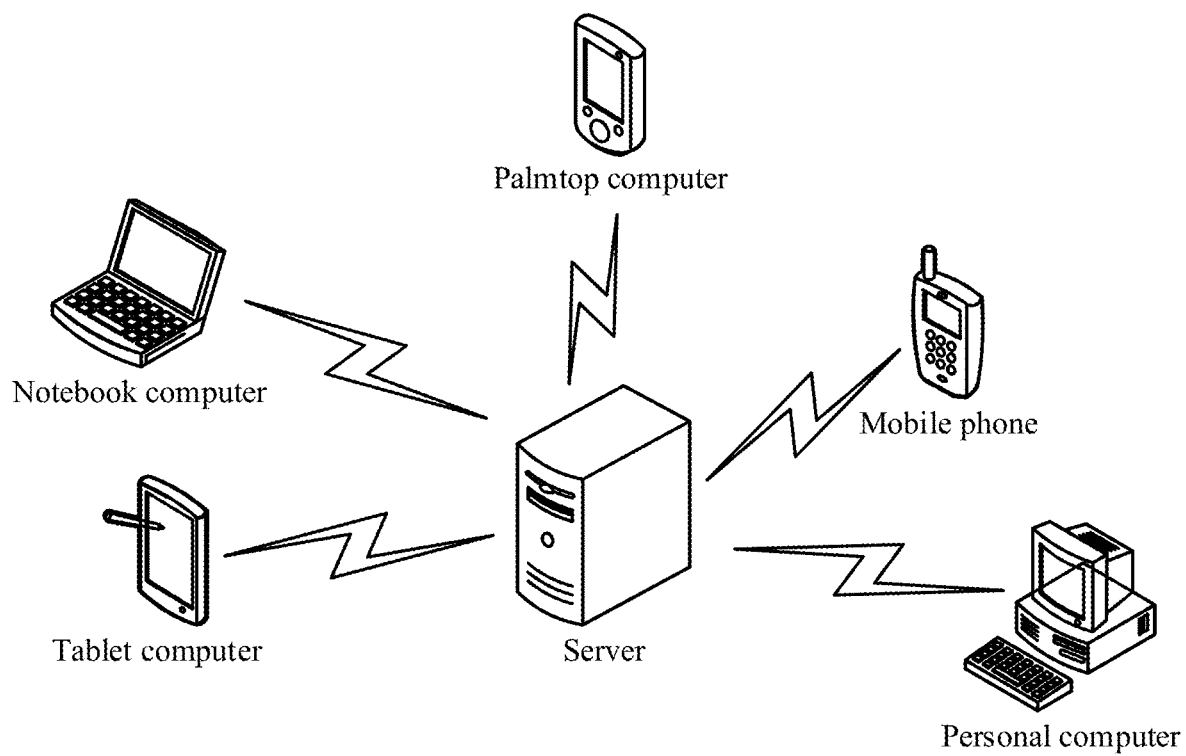
FIG. 1 is a schematic architectural diagram of a model training system according to an embodiment of the present disclosure.

To obtain videos or images with higher reality in the foregoing scenarios, the present disclosure provides a model training method, used for generating a target image or video based on original to-be-synthesized image or video. A difference between the target image or video and the background part is smaller, and therefore, the synthesized video or image has higher reality. The method is applicable to the model training system shown in FIG. 1. FIG. 1 is a schematic architectural diagram of a model training system according to an embodiment of the present disclosure. As shown in FIG. 1, the model training system includes a server and one or more terminal devices.

Specifically, the server may obtain an image sample set and brief-prompt information, the brief-prompt information being used for representing short and/or key information of a to-be-trained object in an image sample. Further, a content mask set is generated according to the image sample set and the brief-prompt information, the content mask in the content mask set being obtained by extending outward a region identified according to the brief-prompt information in the image sample. The server generates a to-be-trained image according to the content mask and the image sample, and the to-be-trained image is included in a to-be-trained image set. The to-be-trained image may include a to-be-trained object and a background image, and a coverage of the content mask is larger than a range of the to-be-trained object, and therefore there is a mask blank part between the to-be-trained object and the background image.

Further, content of the mask blank part is generated through a to-be-trained information synthesis model based on the image sample set and the to-be-trained image set. Further, a predicted image set is outputted and the to-be-trained information synthesis model is trained by using a target loss function based on the predicted image set and the image sample set, to obtain the information synthesis model in a case that a training end condition is satisfied. Then, the server may configure the information synthesis model into a terminal device. In one case, the information synthesis model is included in a client.

For example, with reference to the foregoing application scenarios, a picture-type client (e.g., a client of a picture application) having a picture synthesis function needs to be configured with an information synthesis model, then the server may configure the information synthesis model into the picture-type client, and when the user downloads the picture-type client through the terminal device, the server transmits a client configured with an information synthesis model to the terminal device through a wireless network. It is to be understood that, the picture-type client is only used as an example, clients of other types may also be configured with the information synthesis model in the embodiments of the present disclosure. In another case, an information synthesis model that performs a training operation may alternatively be configured into the terminal device by the server through a wired network manner, a mobile storage apparatus manner, or the like before the delivery of the terminal device. The server may alternatively configure the information synthesis model that performs the training operation into the terminal device through other manners, which is not limited herein.

The server in FIG. 1 is a server configured to train the information synthesis model, may be a server cluster including one or more servers or a cloud computing center, which is not specifically limited herein. The terminal device may be a tablet computer, a notebook computer, a palmtop computer, a mobile phone, a personal computer (PC), or a voice interaction device shown in FIG. 1, or may be a monitoring device, a human face recognition device, or the like, which is not limited herein. The voice interaction device includes, but is not limited to a smart sound and a smart home appliance. In some implementations, the information synthesis model may be integrated into a client. A client configured with an information synthesis model may be represented as a web client, or may be represented as an application client, deployed on the terminal device.

The terminal device may communicate with the server by using a wireless network, a wired network, or a movable storage medium. The foregoing wireless network uses a standard communication technology and/or protocol. The wireless network is usually the Internet, but may alternatively be any other network, including but not limited to, a Bluetooth, a local area network (LAN), a metropolitan area network (MAN), a wide area network (WAN), or any combination of a mobile network, a dedicated network, or a virtual dedicated network. In some embodiments, custom or dedicated data communication technologies may be used in place of or in addition to the foregoing data communication technologies. The movable storage medium may be a universal serial bus (USB) flash drive, a removable hard disk, or another movable storage medium.

Although FIG. 1 only shows five terminal devices and one server, it is understood that, the example in FIG. 1 is only used for understanding this solution, and a specific quantity of the terminal devices and the servers is to be determined with reference to actual situations flexibly.

The embodiments of the present disclosure are applicable to the AI (artificial intelligence) field. Therefore, before the model training method provided in the embodiments of the present disclosure is described, some basic concepts of the AI field are introduced first. AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that responds in a manner similar to human intelligence. AI is to study the design principles and implementation methods of various intelligent machines, to enable the machines to have the functions of perception, reasoning, and decision-making. AI technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning (DL). Machine learning (ML) is a multi-field multidisciplinary, involving probability theory, statistics, approximation theory, a convex analysis, an algorithm complexity theory, and other disciplines, which is specialized in the study of how computers simulate or implement a human learning action to obtain new knowledge or skills and reorganize an obtained knowledge structure, to keep improving its performance. ML is a core to AI, is a fundamental way to make computers intelligent, and its application pervades all fields of AI. ML and DL usually include technologies such as artificial neural network, belief network, reinforcement learning, transfer learning, and inductive learning.

With the research and progress of the AI technology, the AI technology is studied in many directions. The computer vision (CV) is a science that studies how to use a machine to "see" in many research directions of the AI technology, and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies, and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Figure 2:
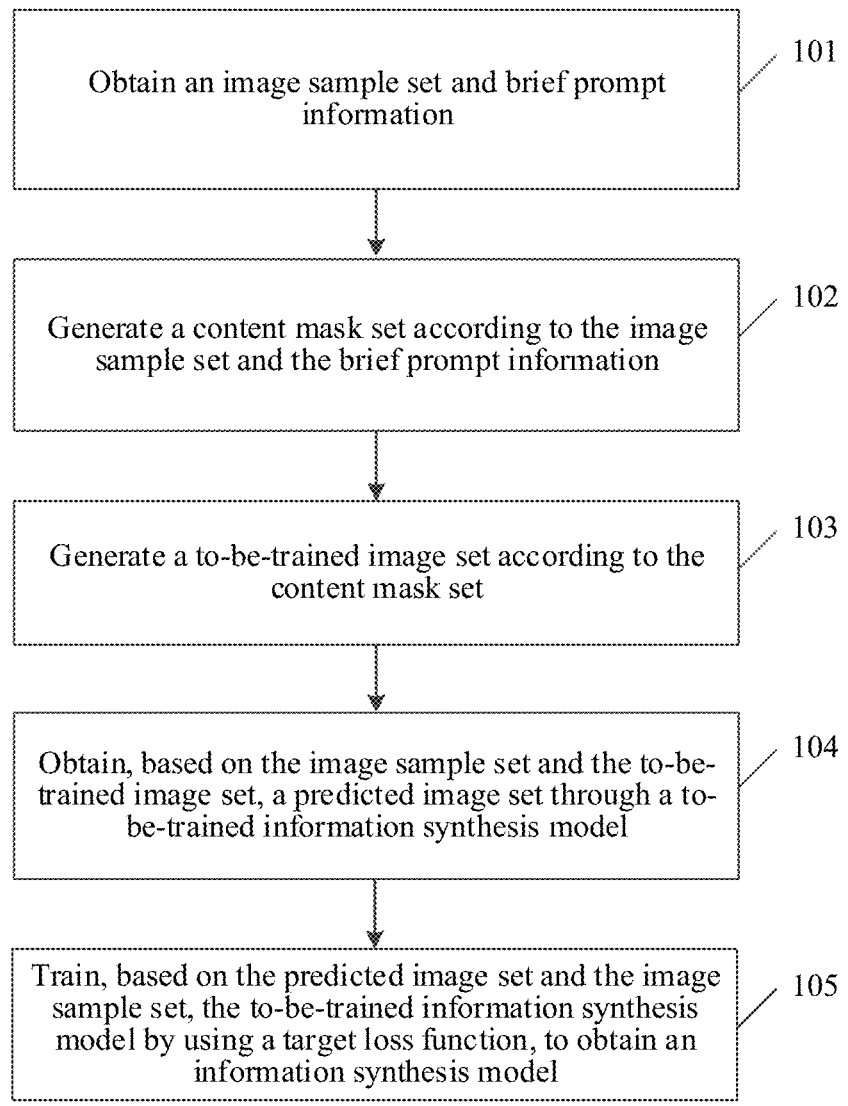
FIG. 2 is a schematic diagram of; a model training method according to an embodiment of the present disclosure.

The solution provided in the embodiments of the present disclosure relates to an image processing technology of AI, and the model training method according to the present disclosure is described below with reference to the foregoing descriptions. Referring to FIG. 2, the model training method according to an embodiment of the present disclosure includes the followings.

101. Obtain an image sample set and brief-prompt information.

The image sample set includes at least one image sample, and the brief-prompt information is used for representing key-point information of a to-be-trained object in the image sample.

In one embodiment, the model training apparatus may store an image sample set, the image sample set including one or more image samples. In a case that the image sample set includes a plurality of image samples, the plurality of image samples may be completely independent of each other, and the plurality of image samples may be alternatively from the same video. The image samples in the image sample set are all real images, that is, not synthesized images. The image sample may be a two-dimensional image, or may be a three-dimensional image. Objects included in the image sample may be such as a person, an animal, home appliances, or an object of another type. Further, the image sample may include an entire object or a part of an object. In an example, the image sample includes only a human face part.

It is understood that, the model training apparatus may be deployed on the server, or may be deployed on the terminal device. For ease of description, an example in which the model training apparatus is deployed on the server is used, however, this is not to be understood as any limitation to the present disclosure.

Specifically, the server may obtain the image sample set from a network gallery, may alternatively directly obtain the image sample set through an image acquisition device, and the server may obtain the image sample set through a combination of any one or more manners in the foregoing manners. The image acquisition device may be a camera.

The server may further obtain brief-prompt information corresponding to each image sample, the brief-prompt information being used for the server to obtain one or more key-points corresponding to the to-be-trained object from the image sample. The brief-prompt information may include two-dimensional coordinates or three-dimensional coordinates corresponding to a key-point of the to-be-trained object in the image sample, may alternatively include two-dimensional pixel coordinates or three-dimensional pixel coordinates corresponding to the key-point of the to-be-trained object in the image sample, and may alternatively include a two-dimensional or three-dimensional rendering image of the to-be-trained object included in the image sample. The content specifically included in the brief-prompt information is not limited herein.

Specifically, in one case, the brief-prompt information may be one or more key-points corresponding to the to-be-trained object obtained after the server directly processes the image sample, that is, the server determines the to-be-trained object in the image sample, and further determines one or more key-points. More specifically, in a case that the image sample includes a human body, the entire human body may be used as the to-be-trained object, so that the server may obtain a plurality of key points corresponding to the to-be-trained object from the image sample by using a human pose estimator method. In another case, the brief-prompt information may alternatively be obtained through another model, in an example, may be a two-dimensional or three-dimensional rendering image of the human body obtained through a skin model.

102. Generate a content mask set according to the image sample set and the brief-prompt information.

The content mask set includes at least one content mask, the content mask being obtained by extending outward a region identified according to the brief-prompt information in the image sample.

In one embodiment, after the server obtains the image sample set and brief-prompt information corresponding to each image sample in the image sample set, because the image sample set includes videos, the server also processes by using each frame of image in the video. Therefore, for each image sample, regardless of whether the image sample is a two-dimensional image or a three-dimensional image, the server may generate at least one content mask corresponding to the image sample according to the image sample and the brief-prompt information. Specifically, the server determines positions of K key-points from the image sample based on the brief-prompt information, K being an integer greater than 1, further, the K key-points may be connected to form a key-point region, and an object in the key-point region in the image sample is the to-be-trained object. After the key-point region is determined according to the K key-points, the key-point region may be expanded outward according to a preset proportion, to generate a content mask. A size of the content mask region may be 105%, 106%, 107%, or the like of a size of the key-point region, which is not specifically limited herein. For each image sample, the server may obtain at least one corresponding content mask, to generate a content mask set after performing the foregoing operation on each image sample in the image sample set.

103. Generate a to-be-trained image set according to the content mask set.

The to-be-trained image set includes at least one to-be-trained image, the to-be-trained image being in correspondence to the image sample.

In one embodiment, for each image sample, the server may cover, after generating at least one content mask corresponding to the image sample, the at least one content mask on the image sample, and therefore, a region corresponding to the content mask in the image sample is set to white, specifically, a region corresponding to the content mask may be all black, or all white, or all other designs and colors different from the color of the background region, to divide the image sample into a region corresponding to the content mask and a background region, the background region being a region in the image sample in addition to the content mask.

Further, the server may generate a to-be-trained image based on the to-be-trained object and the image sample covered with the content mask. Specifically, the server may directly superimpose the to-be-trained object with the image sample covered with the content mask, and a position of the to-be-trained object in the to-be-trained image is consistent with a position of the to-be-trained object in the image sample. A region of the content mask is greater than a region of the to-be-trained object, and therefore, after the to-be-trained object is superimposed with the image sample covered with the content mask, there is still a blank part between the to-be-trained object and the background region. Therefore, the to-be-trained image includes three parts, which are a background region, a to-be-trained object, and a blank part between the background region and the to-be-trained object respectively.

104. Obtain, based on the image sample set and the to-be-trained image set, a predicted image set through a to-be-trained information synthesis model.

The predicted image set includes at least one predicted image, the predicted image being in correspondence to the image sample.

In one embodiment, for each to-be-trained image in the to-be-trained image set, after obtaining the to-be-trained image, the server may input the to-be-trained image into the to-be-trained information synthesis model, for the to-be-trained information synthesis model to generate image content of a blank part in the to-be-trained image, to obtain a target object. A difference between the target object and the to-be-trained object is that, the target object has more content of a blank part than the to-be-trained object does, further, the server needs to merge the target object with a background region in the image sample, to obtain a predicted image. After the server performs the foregoing operation on each to-be-trained object in the to-be-trained image, the predicted image set is obtained.

105. Train, based on the predicted image set and the image sample set, the to-be-trained information synthesis model by using a target loss function, to obtain an information synthesis model.

In one embodiment, for each to-be-trained image in the to-be-trained image set, an objective of training the information synthesis model is to enable the generated predicted image to approximate the image sample. Therefore, after generating the predicted image, the server may obtain an image sample corresponding to the predicted image from the image sample set, to perform an iteration training on the to-be-trained information synthesis model by using the image sample as a target, and to obtain a to-be-trained information synthesis model that performs the training operation in a case that a training condition is satisfied. An iteration training condition may be satisfied in a case that a quantity of times of the iteration training reaches a preset quantity of times, and a value of the preset quantity of times may be 300 thousand, 500 thousand, or the like. Alternatively, the iteration training condition may be satisfied in a case that a loss function of the to-be-trained information synthesis model satisfies a convergence condition, and a specific implementation of satisfying the iteration training condition is not limited herein.

In one embodiment of the present disclosure, an image sample set and brief-prompt information are obtained, the brief-prompt information is used for representing key-point information of a to-be-trained object in the image sample; a content mask set is generated according to the image sample set and the brief-prompt information, the content mask being obtained by extending outward a region identified according to the brief-prompt information in the image sample; and a to-be-trained image set is generated according to the content mask set, the to-be-trained image set including at least one to-be-trained image, the to-be-trained image being in correspondence to the image sample. Based on the image sample set and the to-be-trained image set, a predicted image set is obtained through a to-be-trained information synthesis model, the predicted image being in correspondence to the image sample. Based on the predicted image set and the image sample set, the to-be-trained information synthesis model is trained by using a target loss function, to obtain an information synthesis model. Through the foregoing manners, a to-be-trained image can be generated by using a content mask, and a coverage of the content mask is greater than a range of a to-be-trained object. Therefore, a part between the image content and the background can be generated by an information synthesis model by expanding the boundary appropriately, which avoids defects caused by splicing, thereby improving the reality of the synthesized video.

Optionally, based on the embodiment corresponding to FIG. 2, in an optional embodiment of the model training method according to the embodiments of the present disclosure, the to-be-trained object is a human body object, and step 101 of obtaining an image sample set and brief-prompt information may include:

obtaining the image sample set; and obtaining the brief-prompt information corresponding to the image sample in the image sample set by using a human body pose estimator method; and the generating a content mask set according to the image sample set and the brief-prompt information includes:

generating, based on the image sample in the image sample set and according to the brief-prompt information corresponding to the to-be-trained object, a human body key-point image;

generating, based on the human body key-point image corresponding to the image sample in the image sample set, a human body skeleton connection image, where in a possible implementation, a human body skeleton connection image is generated by using a part affinity field (PAF) algorithm; and generating, based on the human body skeleton connection image corresponding to the image sample in the image sample set, a human body content mask by using a convex hull algorithm, the human body content mask belonging to the content mask.

In one embodiment, the server obtains the image sample set, and an object included in each image sample in the image sample set is a human body object. Each image sample may include a human body object, or may include a plurality of human body objects, which is not limited herein. For each image sample, the server obtains brief-prompt information corresponding to a to-be-trained object in the image sample by using a human body pose estimator method. The human body pose estimator method refers to representing an action of a human body in a graphical format, and to describing a human body pose, including a top-down human body pose estimator method and a down-top human body pose estimator method. In an example, Openpose is a down-top human body pose estimator method. In another example, deepcut is a down-top human body pose estimator method. In an example, regional multi-person pose estimation (RMPE) is a top-down human body pose estimator method. The foregoing three examples all can be implemented through a deep neural network. It is understood that, the example herein is only used for proving the feasibility of this solution, and other human body pose estimator methods may alternatively be adopted. Examples are not shown herein. The to-be-trained object is a human body object in the image sample, and the brief-prompt information may include two-dimensional coordinates or three-dimensional coordinates used for indicating K key-points of the human body pose, alternatively, may include two-dimensional pixel coordinate or three-dimensional pixel coordinate used for indicating K key-points of the human body pose, or the like. This is not specifically limited herein. Further, K may be 18, 24, 58, or another value.

After obtaining the brief-prompt information corresponding to the image sample based on the human body pose estimator method, the server may generate a human body key-point image according to the brief-prompt information corresponding to the to-be-trained object. The human body key-point image shows the K key-points in an image form, and a size and shape of the human body key-point image may be consistent with those of the image sample. An image sample may include one or more human bodies, and therefore, the server may generate a human body skeleton connection image of each human body based on a human body key-point image corresponding to at least one human body in the image sample by using the PAF algorithm. According to the PAF algorithm, key-points belonging to a whole are connected based on a confidence of each key-point, that is, if an image sample includes a plurality of human bodies, key-points belonging to a plurality of human bodies may be respectively connected based on the PAF algorithm, to obtain a human body skeleton connection image including a plurality of human body skeletons. After obtaining the human body skeleton connection image including one or more human body skeletons, the server generates a human body content mask based on the foregoing human body skeleton connection image including one or more human body skeletons by using a convex hull algorithm. The convex hull is defined as a point set on a given two-dimensional plane, the convex hull is a convex polygon formed by connecting the outermost points, and the convex polygon may include all points in the point set. According to the convex hull algorithm, the outermost points in the human body skeleton connection image may be connected to construct a convex human body content mask. The human body content mask belongs to the content mask. A region included in the human body content mask can surround all key-points in the human body skeleton connection image, that is, after the outermost points in the human body skeleton connection image are connected, the human body content mask may be obtained by extending outward by a preset proportion through a convex hull algorithm.

Figure 3:
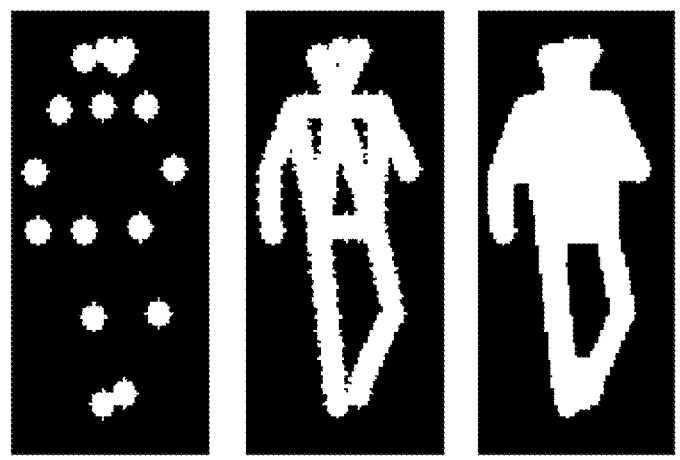
FIG. 3 is a schematic diagram of; generating a human body content mask in a model training method according to an embodiment of the present disclosure.

To further understand this solution, refer to FIG. 3. FIG. 3 is a schematic diagram of an embodiment of generating a human body content mask in a model training method according to an embodiment of the present disclosure. In FIG. 3, an example in which the to-be-trained object in the image sample is a human body object is used, and FIG. 3 includes three schematic sub-diagrams from left to right. The schematic sub-diagram on the left is a human body key-point image corresponding to a human body object in the image sample, the schematic sub-diagram in the middle is a human body skeleton connection image corresponding to the foregoing human body object, and the schematic sub-diagram on the right is a human body content mask (that is, a white region in the schematic sub-diagram on the right) corresponding to the foregoing human body object. Through a comparison between the schematic sub-diagram in the middle and the schematic sub-diagram on the right, obviously, the white region (that is, the human body content mask) in the schematic sub-diagram on the right extends outward compared to the schematic sub-diagram in the middle, and a region corresponding to the human body content mask completely includes a region corresponding to the human body skeleton connection image. It is understood that, the example in FIG. 3 is only for ease of understanding this solution, and is not used for limiting this solution.

In one embodiment of the present disclosure, the server obtains an image sample set, and obtains brief-prompt information corresponding to an image sample in the image sample set by using a human body pose estimator method, further generates, based on the image sample in the image sample set and according to the brief-prompt information corresponding to the to-be-trained object, a human body key-point image, and generates a human body skeleton connection image based on the human body key-point image by using the PAF algorithm, and further generates a human body content mask by using a convex hull algorithm based on the human body skeleton connection image. Through the foregoing manners, a specific implementation of generating a content mask in a case that an object in the image sample is a human body is provided. The brief-prompt information is obtained by using a human body pose estimator method, and the human body content mask is generated by using a convex hull algorithm. Both of the foregoing methods are convenient and simple, easy to operate, and improve the performability of this solution.

Optionally, based on the embodiment corresponding to FIG. 2, in an optional embodiment of the model training method according to the embodiments of the present disclosure, the generating a to-be-trained image set according to a content mask set includes: covering, based on the human body content mask in the content mask set, the human body content mask on the image sample, and then filling the to-be-trained object back to the image sample, to obtain the to-be-trained image in the to-be-trained image set.

In one embodiment, for each image sample in the image sample set, in a case that the to-be-trained object in the image sample is the human body object, the server obtains a human body content mask corresponding to the image sample, and further the server may cover the human body content mask on the image sample. Therefore, a region corresponding to the human body content mask in the image sample becomes a blank, and a region in the image sample other than the human body content mask region is referred to as the background region. The human body object in the image sample is filled back into the human body content mask region, to obtain the to-be-trained image. A position of the human body object (that is, the to-be-trained object) in the to-be-trained image is consistent with a position of the human body object in the image sample. A range of the human body content mask is greater than a range of the human body object, and therefore, after the human body object is filled into the human body content mask, there is still a blank region between the human body object and the background region. That is, the to-be-trained image may include three parts, which are a background region, a human body object, and a blank region between the background region and the human body object respectively.

Figure 4A:
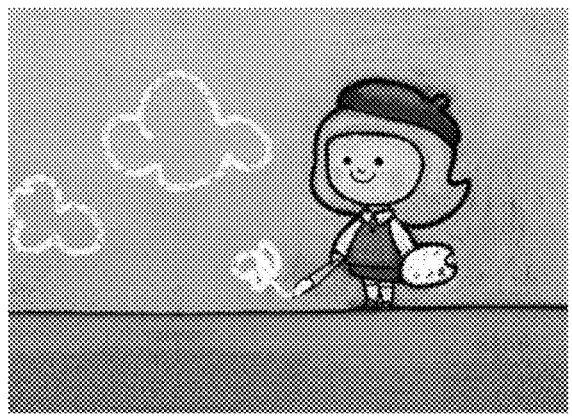
FIG. 4A is a schematic diagram of an image sample in a model training method according to an embodiment of the present disclosure.
Figure 4B:
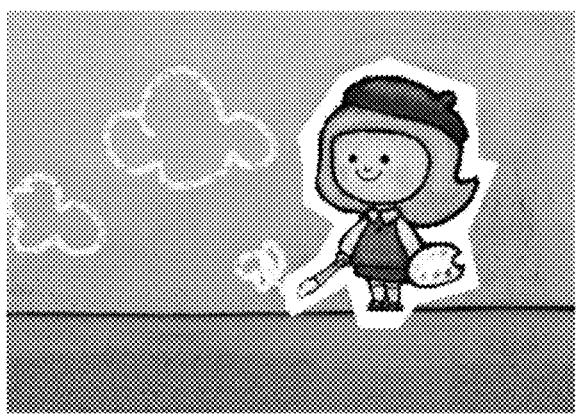
FIG. 4B is a schematic diagram of a to-be-trained image in a model training method according to an embodiment of the present disclosure.

FIG. 4A is a schematic diagram of an image sample in a model training method according to an embodiment of the present disclosure. FIG. 4B is a schematic diagram of a to-be-trained image in a model training method according to an embodiment of the present disclosure. In FIG. 4A and FIG. 4B, examples in which the image sample includes a human body object are used. FIG. 4B is a schematic diagram after a human body content mask is covered on FIG. 4A, and shows a to-be-trained image obtained after the human body content mask is covered. A region range of the human body content mask is greater than a region range of the human body object, and therefore, there is a blank between the background and the human body object. It is understood that, examples shown in FIG. 4A and FIG. 4B are only for ease of understanding this solution, and are not used for limiting this solution.

In one embodiment of the present disclosure, the server covers, based on the human body content mask in the content mask set, the human body content mask on the image sample, to obtain the to-be-trained image in the to-be-trained image set. Through the foregoing manners, a specific implementation in which the server generates a to-be-trained image in a case that the to-be-trained object is a human body object is provided, thereby improving the feasibility of this solution.

Optionally, based on embodiments corresponding to FIG. 2, in the model training method according to the embodiments of the present disclosure, the generating a content mask set according to the image sample set and the brief-prompt information includes: generating, based on the image sample in the image sample set and according to the brief-prompt information corresponding to the to-be-trained object, K target human face key-points, the target human face key-point being in correspondence to a human face key-point, K being an integer greater than 1; generating, based on the K target human face key-points of the image sample in the image sample set, an original human face content mask by using a convex hull algorithm, the original human face content mask belonging to the content mask; generating, based on the original human face content mask of the image sample in the image sample set, an expanded human face content mask according to a mask expansion proportion, the expanded human face content mask belonging to the content mask; and generating, based on the original human face content mask of the image sample in the image sample set, a contracted human face content mask according to a mask contraction proportion, the contracted human face content mask belonging to the content mask.

In one embodiment, in a case that an object included in each image sample in the image sample set is a human face object and the to-be-trained object is a part of the human face, the server may generate, after obtaining the image sample and the brief-prompt information, K target human face key-points based on the image sample in the image sample set and according to the brief-prompt information corresponding to the to-be-trained object, the target human face key-point being in correspondence to the human face key-point, K being an integer greater than 1. In an example, K may be 18, 22, 36, or another value.

Specifically, in one case, the brief-prompt information may include only coordinate information of human face key-points corresponding to the K target human face key-points, and therefore, the server may directly obtain the coordinate information of the human face key-points from the brief-prompt information, and align the coordinate information of the human face key-points in the brief-prompt information into the image sample, to obtain K target human face key-points. In an example, a human face key-point in each frame of image included in the brief-prompt information is $H_k$, the K target human face key-points in the image sample is $C_k$, and then the server needs to align $H_k$ with $C_k$, to obtain coordinate information of $C_k$. In another case, the brief-prompt information is outputted by a skin model, including a video including a plurality of two-dimensional rendering images or a plurality of three-dimensional rendering images of a human face. During playing of the foregoing video, a shape of a part of the human face remains unchanged, and a shape of a part of the human face changes. Therefore, the server may determine human face key-points in each frame of image according to a region edge of the face with changed shapes.

After obtaining an image sample set corresponding to the foregoing video, the server aligns each frame of image in the video including a plurality of two-dimensional rendering images or a plurality of three-dimensional rendering images of a human face with each image in the obtained image sample set, to align the human face key-points determined according to the region edge of the face with changed shapes into the image sample, to obtain K target human face key-points in the image sample. In an example, a video including a plurality of three-dimensional rendering images of human faces shows that a human face says "bought a kilo of vegetables". During playing of the video, only the shape of the mouth changes, the eyes, the nose, or other regions than the mouth in the face remain unchanged, and therefore, human face key-points in each frame of image in the video are determined according to the mouth edge with changed shape.

Figure 5:
FIG. 5 is a schematic diagram of a mouth edge with a changed shape in a model training method according to an embodiment of the present disclosure.

That is, human face key-points that make up the shape of the changed mouth are obtained from each frame of image. Further, the human face key-points that make up the shape of the changed mouth in each frame of image are aligned into each corresponding image sample, to obtain the K target human face key-points in each image sample. To further understand this solution, refer to FIG. 5. FIG. 5 is a schematic diagram of a mouth edge with a changed shape in a model training method according to an embodiment of the present disclosure. In FIG. 5, an example in which the brief-prompt information is a three-dimensional rendering image is used, and a mouth edge with a changed shape in the human face is shown in the figure. FIG. 5 shows one frame of rendering image in a plurality of three-dimensional rendering images, and it is understood that, the example shown in FIG. 5 is only for ease of understanding this solution, and is not used for limiting this solution.

For each image sample in the image sample set, the server may generate, after obtaining K target human face key-points in the image sample, an original human face content mask by using a convex hull algorithm. The convex hull algorithm refers to connecting the K target human face key-points, to construct a convex original human face content mask, the original human face content mask belonging to the content mask. Further, based on the original human face content mask in the image sample, an expanded human face content mask is generated according to a mask expansion proportion. The mask expansion proportion may be 5%, 6%, 7%, or the like, and the expanded human face content mask belongs to the content mask.

Specifically, the server may expand the human face content mask by expanding pixels. In an example, the image sample is a 256×256 image, and then the server may implement an expansion proportion of 6% by expanding 15 pixels, and a specific pixel value may change with a resolution of the video. The example herein is only for ease of understanding this solution, and is not used for limiting this solution. The server may further generate, based on the original human face content mask of the image sample, a contracted human face content mask according to a mask contraction proportion. The mask contraction proportion may be 5%, 6%, 7%, or the like, and the contracted human face content mask belongs to the content mask. Specifically, the server may contract the human face content mask by contracting pixels, and examples are not shown herein again. Further, all of the original human face content mask, the expanded human face content mask, and the contracted human face content mask are corresponding regions of the human face content mask in the human face.

Figure 6:
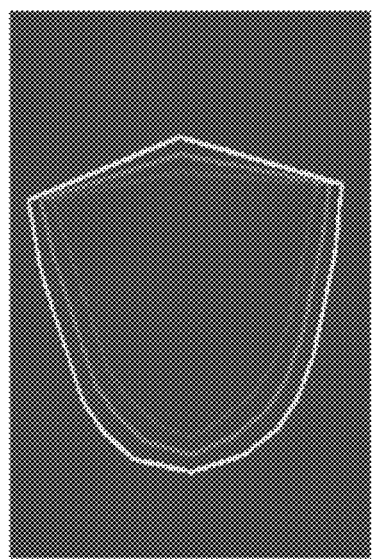
FIG. 6 is a schematic diagram of a human face content mask in a model training method according to an embodiment of the present disclosure.

To further understand this solution, refer to FIG. 6. FIG. 6 is a schematic diagram of a human face content mask in a model training method according to an embodiment of the present disclosure. In FIG. 6, an example in which the human face content mask corresponds to a mouth region of a human face is used with reference to FIG. 5. FIG. 6 shows three sets of closed lines separately, which correspond to three regions respectively. A closed region formed by the outermost lines is an expanded human face content mask, a closed region formed by the middle lines is an original human face content mask, and a closed region formed by the innermost lines is a contracted human face content mask. It is understood that, the example in FIG. 6 is only for ease of understanding this solution, and is not used for limiting this solution. After performing the foregoing operation for each image sample in the image sample set, the server obtains an original human face content mask, an expanded human face content mask, and a contracted human face content mask of each image sample.

In one embodiment of the present disclosure, the server generates, based on the image sample in the image sample set and according to brief-prompt information corresponding to a to-be-trained object, K target human face key-points, and generates, based on the K target human face key-points of the image sample, an original human face content mask by using a convex hull algorithm. Further, the server generates, based on the original human face content mask in the image sample, an expanded human face content mask according to a mask expansion proportion, and generates, based on the original human face content mask of the image sample, a contracted human face content mask according to a mask contraction proportion. Through the foregoing manners, a specific implementation of obtaining a content mask in a case that an object in the image sample is a human face is provided, thereby expanding an application scenario of this solution and improving the flexibility of implementing this solution.

Optionally, based on embodiments corresponding to FIG. 2, in the model training method according to the embodiments of the present disclosure, the generating a to-be-trained image set according to a content mask set includes: covering, according to an expanded human face content mask corresponding to an image sample in the image sample set, the expanded human face content mask on the image sample, to obtain a first mask image; extracting, according to a contracted human face content mask corresponding to the image sample in the image sample set, image content of a region corresponding to the contracted human face content mask in the image sample, to obtain a second mask image; and generating, according to the first mask image and the second mask image, the to-be-trained image corresponding to the image sample.

In one embodiment, for each image sample in the image sample set, after the server obtains the expanded human face content mask and the contracted human face content mask, the server may cover the expanded human face content mask on the image sample, that is, a region corresponding to the expanded human face content mask in the image sample is set to a blank, to obtain the first mask image; and cover the contracted human face content mask on the image sample, that is, image content in the contracted human face content mask is taken out from the image sample, to obtain the second mask image. After obtaining the first mask image and the second mask image, the server may overlay the first mask image and the second mask image, that is, fills the second mask image into a blank region in the first mask image, to generate the to-be-trained image corresponding to the image sample. A position of the first mask image in the to-be-trained image is consistent with a position of the first mask image in the image sample. A region range corresponding to the expanded human face content mask is greater than a region position corresponding to the contracted human face content mask, and therefore, there is a blank between the second mask image and the first mask image in the generated to-be-trained image. That is, the to-be-trained image includes three parts, which are a first mask image (that is, a background region), a second mask image (that is, a to-be-trained object), and a blank between the second mask image and the first mask image respectively. After performing the foregoing operation for each image sample in the image sample set, the server obtains a to-be-trained image corresponding to each image sample, to obtain a to-be-trained image set.

Figure 7A:
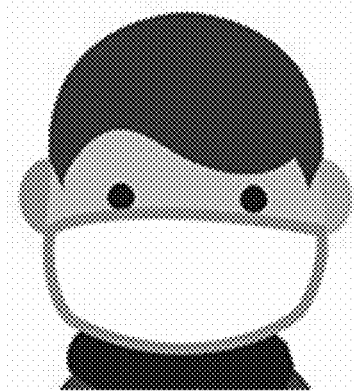
FIG. 7A is a schematic diagram of a first mask image in a model training method according to an embodiment of the present disclosure.
Figure 7B:
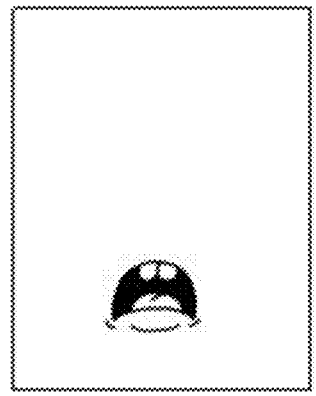
FIG. 7B is a schematic diagram of a second mask image in a model training method according to an embodiment of the present disclosure.
Figure 7C:
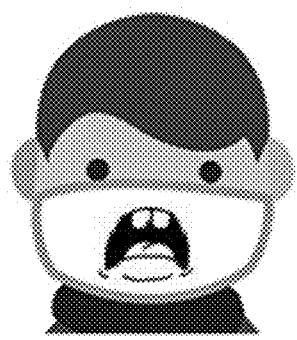
FIG. 7C is a schematic diagram of a to-be-trained image in a model training method according to an embodiment of the present disclosure.

To further understand this solution, refer to FIG. 7A to FIG. 7C. FIG. 7A is a schematic diagram of a first mask image in a model training method according to an embodiment of the present disclosure. FIG. 7B is a schematic diagram of a second mask image in a model training method according to an embodiment of the present disclosure. FIG. 7C is a schematic diagram of a to-be-trained image in a model training method according to an embodiment of the present disclosure. A mask part in FIG. 7A is an expanded human face content mask region, a blank region in FIG. 7C, for example, a region at which the nose (not shown in the figure) is located in FIG. 7C is a blank. It is understood that, examples in FIG. 7A to FIG. 7C are only for ease of understanding this solution, and are not used for limiting this solution.

In one embodiment of the present disclosure, the server covers, according to an expanded human face content mask corresponding to an image sample, the expanded human face content mask on the image sample, to obtain a first mask image; and covers, according to a contracted human face content mask corresponding to the image sample, the contracted human face content mask on the image sample, to obtain a second mask image by extracting image content of the coverage region; and further generates, according to the first mask image and the second mask image, the to-be-trained image corresponding to the image sample. Through the foregoing manners, a specific implementation of obtaining a to-be-trained image in a case that an object in the image sample is a human face is provided, thereby expanding an application scenario of this solution and improving the flexibility of implementing this solution. The first mask image and the second mask image are generated respectively, and the to-be-trained image is generated according to the first mask image and the second mask image. The to-be-trained object is some regions of the human face, and therefore, the operation is more refined, which is beneficial to improving the quality of the generated to-be-trained image.

Optionally, based on embodiments corresponding to FIG. 2, in the model training method according to the embodiments of the present disclosure, the training, based on the predicted image set and the image sample set, the to-be-trained information synthesis model by using a target loss function, to obtain an information synthesis model may include: determining a first loss function according to the image sample in the image sample set, the predicted image corresponding to the image sample, and the to-be-trained image corresponding to the image sample; determining a second loss function according to the image sample in the image sample set and the predicted image corresponding to the image sample; determining the target loss function according to the first loss function and the second loss function; updating a model parameter of the to-be-trained information synthesis model according to the target loss function; and generating, in a case that an iteration end condition is satisfied, the information synthesis model according to the model parameter of the to-be-trained information synthesis model.

In one embodiment, for each image sample in the image sample set, the server determines a first loss function according to the image sample, the predicted image corresponding to the image sample, and the to-be-trained image corresponding to the image sample; determines a second loss function according to the image sample and the predicted image corresponding to the image sample; the server determines the target loss function according to the first loss function and the second loss function; and further determines whether the target loss function satisfies a convergence condition, and substitutes a function value of the target loss function into the foregoing gradient descent algorithm in a case that the convergence condition is not satisfied, to update the model parameter of the to-be-trained information synthesis model in a gradient method. The server can perform the foregoing operation once for each predicted image generated by the to-be-trained information synthesis model, until the target loss function satisfies the convergence condition, and then the information synthesis model is generated according to a model parameter obtained by updating the model parameter last time.

The first loss function may be generated according to pixel values of the image sample, the predicted image corresponding to the image sample, and the to-be-trained image corresponding to the image sample, and be used for reflecting a pixel difference between the image sample and the predicted image and a pixel difference between the image sample and the to-be-trained image. The second loss function may be obtained based on the image sample, the predicted image, and the generative adversarial network (GAN).

The GAN includes a generator and a discriminator, the generator being the to-be-trained information synthesis model in the embodiments of the present disclosure, the discriminator being configured to discriminate whether an image inputted into the discriminator is a real image or a forged image. The GAN training refers to that the generator generates an image to deceive the discriminator, and then the discriminator determines whether the image and a corresponding real image are real or not. During training of the two models, capabilities of the two models become stronger, and a stable state is reached finally. Further, the discriminator may generate two types of probability values, and the two types of probability values are a first probability value representing that the predicted image is a forged image and a second probability value representing that the image sample is a real image respectively. Both of the first probability value and the second probability value outputted by the discriminator are probability values between 0 and 1. An objective of training the discriminator is to enable the first probability value to be as close to 0 as possible, and to enable the second probability value to be as close to 1 as possible, to obtain an accurate classification capability. However, an objective of training the generator is to enable the first probability value outputted by the discriminator to be as close to 1 as possible.

The convergence condition of the target loss function may be that a value of the target loss function is less than or equal to a first preset threshold. In an example, a value of the first preset threshold may be 0.005, 0.01, 0.02, or another value close to 0. Alternatively, the convergence condition may be that a difference between adjacent two values of the target loss function is less than or equal to a second preset threshold, and a value of the second preset threshold may be the same as or different from that of the first preset threshold. In an example, a value of the second preset threshold may be such as 0.005, 0.01, 0.02, or another value close to 0, and the server may alternatively adopt other convergence conditions. This is not limited herein.

In one embodiment of the present disclosure, through the foregoing manners, the server trains the to-be-trained information synthesis model through the image sample, the predicted image corresponding to the image sample, and the to-be-trained image corresponding to the image sample, which is beneficial to helping a synthesized image outputted by the information synthesis model be close the real image sample, and is beneficial to improving the reality of the synthesized image. Further, a target function value is generated by using the image sample, the predicted image corresponding to the image sample, the pixel of the to-be-trained image corresponding to the image sample, and the discriminator, which is easy and convenient, and improves the operability.

Optionally, based on embodiments corresponding to FIG. 2, in a model training method according to an embodiment of the present disclosure, that the server determines the target loss function according to the first loss function and the second loss function includes: calculating the target loss function in the following manner:

$$L(G, D) = E_{f,r}[L_r(G) + \lambda_s L_s(G, D)];$$

$$L_r(G) = \|m \otimes (f - G(r))\|_1;$$

$$L_s(G, D) = \log(D(r, f)) + \log(1 - D(r, G(r)));$$

where $L(G, D)$ represents the target loss function, E represents an expected value calculation, $L_r(G)$ represents the first loss function, $L_s(G, D)$ represents the second loss function, G( ) represents a generator in the to-be-trained information synthesis model, D( ) represents a discriminator in the to-be-trained information synthesis model, $\lambda_s$ represents a first preset coefficient, f represents the image sample, r represents the to-be-trained image, G(r) represents the predicted image, m represents the content mask in the to-be-trained image, and ⊗represents a per-pixel multiplication.

In one embodiment of the present disclosure, through the foregoing manners, specific formulas of the first loss function, the second loss function, and the target loss function are provided during processing of a static image, further improving the implementability and enforceability of this solution.

Optionally, based on embodiments corresponding to FIG. 2, in the model training method according to an embodiment of the present disclosure, the image sample set includes a plurality of consecutive image samples, and the plurality of consecutive image samples are used for forming a video sample. The training, based on the predicted image set and the image sample set, the to-be-trained information synthesis model by using a target loss function, to obtain an information synthesis model may include: determining a first loss function according to N frames of predicted images in the predicted image set, N frames of to-be-trained images in the to-be-trained image set, and N frames of image samples in the image sample set, N being an integer greater than 1; determining a second loss function according to N frames of predicted images in the predicted image set and N frames of image samples in the image sample set; determining the target loss function according to the first loss function and the second loss function; updating a model parameter of the to-be-trained information synthesis model according to the target loss function; and generating, in a case that an iteration end condition is satisfied, the information synthesis model according to the model parameter of the to-be-trained information synthesis model.

In one embodiment, after the server obtains the predicted image set and the image sample set, because the foregoing image sample set corresponds to a video, the server determines a value of a first loss function corresponding to each frame of image according to each of N frames of predicted images in the predicted image set, each frame of to-be-trained image, and each frame of image sample, repeats the foregoing operation for N times, and adds values of the first loss functions corresponding to the N frames of images to obtain a final value of the first loss function; and determines a second loss function corresponding to each frame of image according to each frame of predicted image in the predicted image set and each frame of image sample in the image sample set, repeats the foregoing operation for N times, and adds values of the second loss functions corresponding to the N frames of images, to obtain a final value of the second loss function. For a specific implementation in which the server obtains the value of the first loss function corresponding to each frame of image and the second loss function corresponding to each frame of image, reference may be made to the foregoing embodiments, and details are not repeated herein. Further, the target loss function is determined according to the first loss function and the second loss function, the model parameter of the to-be-trained information synthesis model is updated according to the target loss function, and in a case that an iteration end condition is satisfied, the information synthesis model is generated according to the model parameter of the to-be-trained information synthesis model.

In one embodiment of the present disclosure, through the foregoing manners, the server trains the to-be-trained information synthesis model through a video sample, a predicted video corresponding to the video sample, and a to-be-trained video corresponding to the video sample, which is beneficial to helping a synthesized video outputted by the information synthesis model be close the real video sample, and is beneficial to improving the reality of the synthesized video.

Optionally, based on the embodiment corresponding to FIG. 2, in a model training method according to an embodiment of the present disclosure, the determining the target loss function according to the first loss function and the second loss function includes: calculating the target loss function in the following manner:

$$L(G, D) = E_{f,r}[L_r(G) + \lambda_s L_s(G, D)];$$

$$L_r(G) = \|m \otimes (f - G(o \oplus r))\|_1;$$

$$L_s(G, D) = \log(D(r, f)) + \log(1 - D(r, G(o \oplus r)));$$

where L(G, D) represents the target loss function, E represents an expected value calculation, $L_r(G)$ represents the first loss function, the first loss function being used for representing a loss in a content mask in an $N^{th}$ frame of predicted image, optionally, the first loss function is used for representing a loss in an expanded human face content mask in the $N^{th}$ frame of predicted image, $L_s(G, D)$ represents the second loss function, the second loss function representing a spatial adversarial loss of each frame of image, G( ) represents a generator in the to-be-trained information synthesis model, D( ) represents a discriminator in the to-be-trained information synthesis model, $\lambda_s$ represents a first preset coefficient, O represents (N−1) frames of to-be-trained images, f represents an $N^{th}$ frame of image sample, r represents an $N^{th}$ frame of to-be-trained image, m represents a content mask of the $N^{th}$ frame of to-be-trained image, ⊗ represents a per-pixel multiplication, and ⊕ represents a superposition of image frames.

In one embodiment of the present disclosure, through the foregoing manners, specific formulas of the first loss function, the second loss function, and the target loss function are provided during processing of a video, further improving the implementability and enforceability of this solution, and expanding an application scenario of this solution.

Optionally, based on embodiments corresponding to FIG. 2, in the model training method according to an embodiment of the present disclosure, the image sample set includes a plurality of consecutive image samples, and the plurality of consecutive image samples are used for forming a video sample. The training, by the server based on the predicted image set and the image sample set, the to-be-trained information synthesis model by using a target loss function, to obtain an information synthesis model includes: determining, by the server, a first loss function according to N frames of predicted images in the predicted image set, N frames of to-be-trained images in the to-be-trained image set, and N frames of image samples in the image sample set, N being an integer greater than 1; determining, by the server, a second loss function according to N frames of predicted images in the predicted image set and N frames of image samples in the image sample set; determining, by the server, a third loss function according to M frames of predicted images in the predicted image set and M frames of image samples in the image sample set, M being an integer greater than or equal to 1 and less than or equal to N; determining, by the server, the target loss function according to the first loss function, the second loss function, and the third loss function; updating, by the server, a model parameter of the to-be-trained information synthesis model according to the target loss function; and generating, by the server in a case that an iteration end condition is satisfied, the information synthesis model according to the model parameter of the to-be-trained information synthesis model.

In one embodiment, in addition to determining the first loss function according to the N frames of predicted images in the predicted image set, the N frames of to-be-trained images in the to-be-trained image set, and the N frames of image samples in the image sample set, and determining the second loss function according to the N frames of predicted images in the predicted image set and the N frames of image samples in the image sample set, the server further determines the third loss function according to the M frames of predicted images in the predicted image set and the M frames of image samples in the image sample set. The third loss function is used for representing a loss in time sequence, and further allocating corresponding weights to the first loss function, the second loss function, and the third loss function, to obtain a target loss function. A model parameter of the to-be-trained information synthesis model is updated according to the target loss function, and then the server generates, in a case that an iteration end condition is satisfied, the information synthesis model according to the model parameter of the to-be-trained information synthesis model.

In one embodiment of the present disclosure, the target loss function is determined according to the first loss function, the second loss function, and the third loss function, and the model parameter of the to-be-trained information synthesis model is iteratively updated according to the target loss function. The third loss function is a loss item related to the time sequence, and therefore, it is beneficial to helping content generated by the information synthesis model be more consistent in the time sequence, and to improving the reality of the synthesized video.

Optionally, based on embodiments corresponding to FIG. 2, in a model training method according to an embodiment of the present disclosure, the determining the target loss function according to the first loss function, the second loss function, and the third loss function includes: calculating the target loss function in the following manner:

$$L(G, D_s, D_t) = E_{f,r}[L_r(G) + \lambda_s L_s(G, D_s) + \lambda_t L_t(G, D_t)];$$

$$L_r(G) = \|m \otimes (f - G(o \oplus r))\|_1;$$

$$L_s(G, D_s) = \log(D_s(r, f)) + \log(1 - D_s(r, G(o \oplus r)));$$

$$L_t(G, D_t) = \log(D_t(r, \Delta_i(f))) + \log(1 - D_t(r, G(\Delta_i(o) \oplus (\Delta_i(r)))));$$

where $L(G, D_s, D_t)$ represents the target loss function, $L_r(G)$ represents the first loss function, $L_s(G_s, D_s)$ represents the second loss function, $L_t(G, D_t)$ represents the third loss function, the third loss function being used for representing a loss in time sequence, G( ) represents a generator in the to-be-trained information synthesis model, G(r) represents the predicted image, $D_s(\ )$ represents a first discriminator in the to-be-trained information synthesis model, $D_t(\ )$ represents a second discriminator in the to-be-trained information synthesis model, $\lambda_s$ represents a first preset coefficient, $\lambda_t$ represents a second preset coefficient, O represents (N−1) frames of to-be-trained images, f represents an $N^{th}$ frame of image sample, r represents an $N^{th}$ frame of to-be-trained image, m represents a content mask of the $N^{th}$ frame of to-be-trained image, $\Delta_i$ represents M frames of images generated by translating i frames forward, ⊗ represents a per-pixel multiplication, and ⊕ represents a superposition of image frames.

In one embodiment of the present disclosure, through the foregoing manners, specific formulas of the first loss function, the second loss function, the third loss function, and the target loss function are provided during processing of a video, further improving the implementability and enforceability of this solution, and expanding the selection flexibility of this solution.

Figure 8:
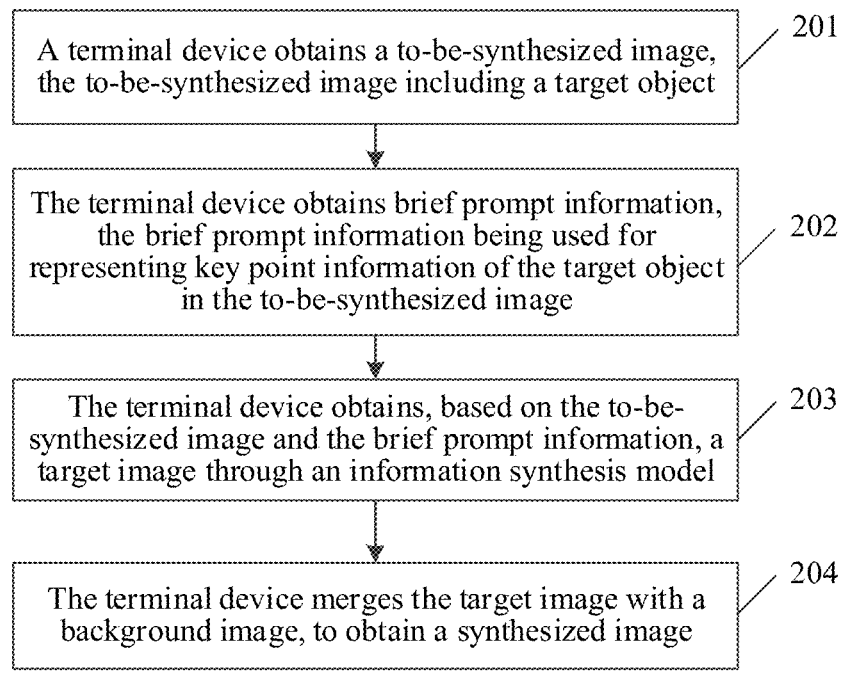
FIG. 8 is a schematic diagram of a media information synthesis method according to an embodiment of the present disclosure.

An embodiment of the present disclosure further provides a media information synthesis method. Referring to FIG. 8, a media information synthesis method according to an embodiment of the present disclosure includes the followings.

201. A terminal device obtains a to-be-synthesized image, the to-be-synthesized image including a target object.

In one embodiment, a terminal device obtains a to-be-synthesized image, the to-be-synthesized image including a target object. Specifically, the target object in the to-be-synthesized image may be a human body, a human face, a part of the human face or another object in the human face, or the like.

It is understood that, the media information synthesis apparatus may be deployed on a server, or may be deployed on the terminal device. For ease of description, an example in which the media information synthesis apparatus is deployed on the terminal device is used, however, this is not to be understood as any limitation to the present disclosure.

202. The terminal device obtains brief-prompt information, the brief-prompt information being used for representing key-point information of the target object in the to-be-synthesized image.

In one embodiment, the terminal device obtains brief-prompt information corresponding to a to-be-synthesized image object, the brief-prompt information being used for representing key-point information of the target object in the to-be-synthesized image. Specifically, in a case that the target object in the to-be-synthesized image is a human body object, the terminal device may obtain brief-prompt information used for representing the key-point information of the target object in the to-be-synthesized image based on a human body pose estimator method. The terminal device may determine, in a case that the target object in the to-be-synthesized image is a human face object, key-point information or the like used for representing that the target object is in the to-be-synthesized image based on an edge of the target object. This is not limited herein. The key-point information may be coordinate information of the key-point, for example, two-dimensional coordinate information, three-dimensional coordinate information, two-dimensional pixel coordinate information, and three-dimensional coordinate information.

203. The terminal device obtains, based on the to-be-synthesized image and the brief-prompt information, a target image through an information synthesis model, the information synthesis model being obtained through training by adopting the method described in each method embodiment corresponding to FIG. 2.

In one embodiment, the terminal device inputs a to-be-synthesized image, brief-prompt information, and a background image into the information synthesis model, and the information synthesis model may obtain a target object from the to-be-synthesized image based on the brief-prompt information, further generate a target image corresponding to the target object, the target image including the target object and a splicing part of the target object and the background image, the information synthesis model being obtained through training by adopting the method described in each method embodiment corresponding to FIG. 2.

204. The terminal device merges the target image with a background image, to obtain a synthesized image.

In one embodiment, after obtaining the target image, the terminal device merges the target image with a background image, to obtain a synthesized image.

In one embodiment of the present disclosure, a to-be-synthesized image is obtained, the to-be-synthesized image including a target object; brief-prompt information is obtained, the brief-prompt information being used for representing key-point information of the target object in the to-be-synthesized image; a target image is further obtained based on the to-be-synthesized image and the brief-prompt information through an information synthesis model, the information synthesis model being obtained through training by adopting the method according to the first aspect; and the target image is merged with a background image, to obtain a synthesized image. Through the foregoing manners, a specific implementation of synthesizing a static image is provided, thereby improving the implementability. Moreover, the information synthesis model is obtained through training by adopting the method according to the first aspect, the to-be-trained image is generated by using a content mask during training, and a coverage of the content mask is greater than a range of a to-be-trained object. Therefore, a part between the target image and the background image can be generated by the information synthesis model by expanding the boundary appropriately, which avoids defects caused by splicing, thereby improving the reality of the synthesized image.

Figure 9:
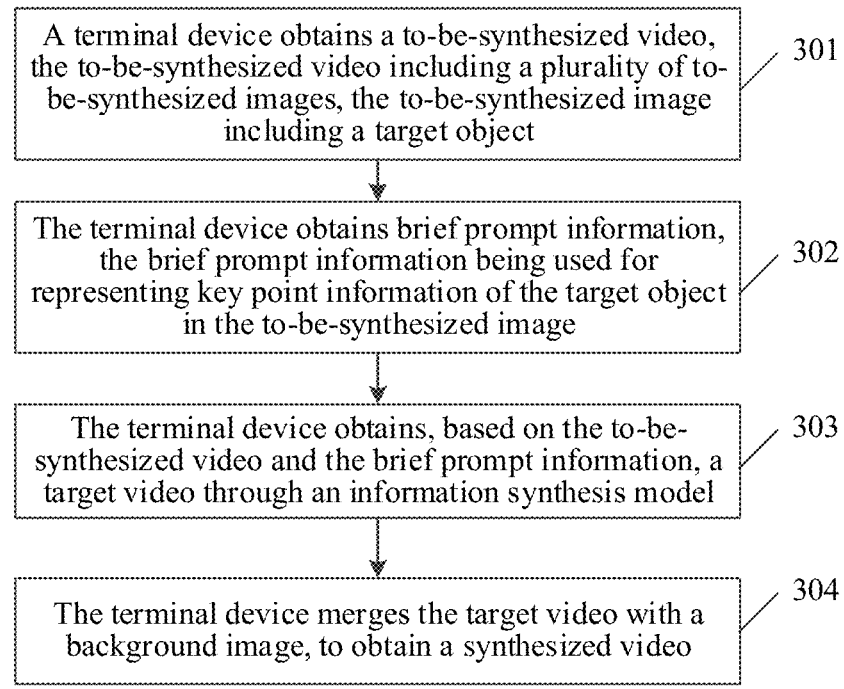
FIG. 9 is a schematic diagram of another media information synthesis method according to an embodiment of the present disclosure.

An embodiment of the present disclosure further provides a media information synthesis method. Referring to FIG. 9, a media information synthesis method according to an embodiment of the present disclosure includes the followings.

301. A terminal device obtains a to-be-synthesized video, the to-be-synthesized video including a plurality of to-be-synthesized images, the to-be-synthesized image including a target object.

In one embodiment, the terminal device obtains a to-be-synthesized video, the to-be-synthesized video including a plurality of to-be-synthesized images, the to-be-synthesized image including a target object. Specifically, the target object in the to-be-synthesized video may be a human body, a human face, a part of the human face or another object in the human face, or the like.

It is understood that, the media information synthesis apparatus may be deployed on a server, or may be deployed on the terminal device. For ease of description, an example in which the media information synthesis apparatus is deployed on the terminal device is used, however, this is not to be understood as any limitation to the present disclosure.

302. The terminal device obtains brief-prompt information, the brief-prompt information being used for representing key-point information of the target object in the to-be-synthesized image.

In one embodiment, for each to-be-synthesized image in the to-be-synthesized video, the terminal device obtains brief-prompt information corresponding to a to-be-synthesized image object, the brief-prompt information being used for representing key-point information of the target object in each frame of the to-be-synthesized image. Specifically, regardless of whether the object in the to-be-synthesized video is a human body or a human face, in one case, the brief-prompt information may be a video including a plurality of three-dimensional rendering images or two-dimensional rendering images obtained through a skin model, shapes of some regions between the plurality of three-dimensional rendering images or two-dimensional rendering images being same, shapes of some regions between the plurality of three-dimensional rendering images or two-dimensional rendering images being changed. The target object is the region with changed shapes, and therefore, the terminal device may align the video including a plurality of three-dimensional rendering images or two-dimensional rendering images with the to-be-synthesized video, and determine the key-point information used for representing that the target object is in the to-be-synthesized image according to an edge of the region with changed shapes in the video including a plurality of three-dimensional rendering images or two-dimensional rendering images. In another case, after obtaining the to-be-synthesized video, the terminal device may directly mark the key-point for each frame of image in the to-be-synthesized video, to obtain the key-point information. The key-point information may be coordinate information of the key-point, for example, two-dimensional coordinate information, three-dimensional coordinate information, two-dimensional pixel coordinate information, and three-dimensional coordinate information.

303. The terminal device obtains, based on the to-be-synthesized video and the brief-prompt information, a target video through an information synthesis model.

In one embodiment, the terminal device inputs a to-be-synthesized video, brief-prompt information, and a background image into the information synthesis model, and the information synthesis model may obtain a target object from each frame of image of the to-be-synthesized video based on the brief-prompt information, further generate a target image corresponding to the target object in each frame of image. Therefore, a target video may be obtained after the foregoing operation is performed for all images in the to-be-synthesized video, the target video including the target object and a splicing part of the target object and the background image, the information synthesis model being obtained through training by adopting the method described corresponding to FIG. 2.

304. The terminal device merges the target video with a background image, to obtain a synthesized video.

In one embodiment, after obtaining the target video, the terminal device merges the target video with a background image, to obtain a synthesized video.

In one embodiment of the present disclosure, a to-be-synthesized video is obtained, the to-be-synthesized video including a plurality of to-be-synthesized images, the to-be-synthesized image including a target object; and brief-prompt information is obtained, the brief-prompt information being used for representing key-point information of the target object in the to-be-synthesized image; further a target video is obtained based on the to-be-synthesized video and the brief-prompt information through an information synthesis model, the information synthesis model being obtained through training by adopting the method according to the first aspect; and the target video is merged with a background image, to obtain a synthesized video. Through the foregoing manners, a specific implementation of synthesizing a video is provided, thereby improving the flexibility. Moreover, the information synthesis model is obtained through training by adopting the method according to the first aspect, the to-be-trained video is generated by using a content mask during training, and a coverage of the content mask is greater than a range of a to-be-trained object. Therefore, a part between the target video and the background image can be generated by the information synthesis model by expanding the boundary appropriately, which avoids defects caused by splicing, thereby improving the reality of the synthesized video.

Figure 10:
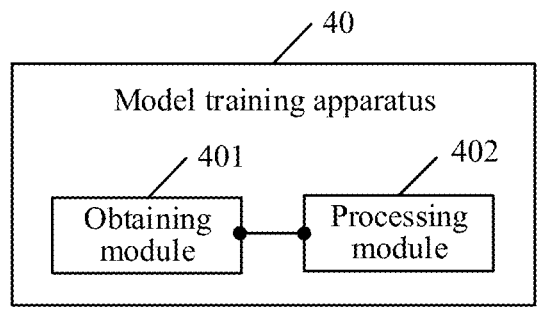
FIG. 10 is a schematic diagram of a model training apparatus according to an embodiment of the present disclosure.

A model training apparatus in the present disclosure is described below in detail. FIG. 10 is a schematic diagram of a model training apparatus according to an embodiment of the present disclosure. A model training apparatus 40 includes: an obtaining module 401, and a processing module 402.

The obtaining module 401 is configured to obtain an image sample set and brief-prompt information, the image sample set including at least one image sample, the brief-prompt information being used for representing key-point information of a to-be-trained object in the image sample.

The processing module 402 is configured to generate a content mask set according to the image sample set and the brief-prompt information obtained by the obtaining module 401, the content mask set including at least one content mask, the content mask being obtained by extending outward a region identified according to the brief-prompt information in the image sample.

The processing module 402 may be further configured to generate a to-be-trained image set according to the content mask set generated by the processing module 402, the to-be-trained image set including at least one to-be-trained image, the to-be-trained image being in correspondence to the image sample.

The processing module 402 may be further configured to obtain, based on the image sample set obtained by the obtaining module 401 and the to-be-trained image set generated by the processing module 402, a predicted image set through a to-be-trained information synthesis model, the predicted image set including at least one predicted image, the predicted image being in correspondence to the image sample.

The processing module 402 may be further configured to train, based on the predicted image set synthesized by the processing module 402 and the image sample set obtained by the obtaining module 401, the to-be-trained information synthesis model by using a target loss function, to obtain an information synthesis model.

In one embodiment, the obtaining module 401 obtains an image sample set and brief-prompt information, the image sample set including at least one image sample, the brief-prompt information being used for representing key-point information of a to-be-trained object in the image sample. The processing module 402 generates a content mask set according to the image sample set and the brief-prompt information obtained by the obtaining module 401, the content mask set including at least one content mask, the content mask being obtained by extending outward a region identified according to the brief-prompt information in the image sample. The processing module 402 generates a to-be-trained image set according to the content mask set generated by the processing module 402, the to-be-trained image set including at least one to-be-trained image, the to-be-trained image being in correspondence to the image sample. The processing module 402 obtains, based on the image sample set obtained by the obtaining module 401 and the to-be-trained image set generated by the processing module 402, a predicted image set through a to-be-trained information synthesis model, the predicted image set including at least one predicted image, the predicted image being in correspondence to the image sample. The processing module 402 trains, based on the predicted image set synthesized by the processing module 402 and the image sample set obtained by the obtaining module 401, the to-be-trained information synthesis model by using a target loss function, to obtain an information synthesis model.

Optionally, based on embodiments corresponding to FIG. 10, the to-be-trained object is the human body object, and in the model training apparatus 40 provided in one embodiment of the present disclosure, the obtaining module 401 is specifically configured to: obtain the image sample set; and obtain the brief-prompt information corresponding to the image sample in the image sample set by using a human body pose estimator method. The processing module 402 is specifically configured to: generate, based on the image sample in the image sample set and according to the brief-prompt information corresponding to the to-be-trained object, a human body key-point image; generate, based on the human body key-point image corresponding to the image sample in the image sample set, a human body skeleton connection image; and generate, based on the human body skeleton connection image corresponding to the image sample in the image sample set, a human body content mask by using a convex hull algorithm, the human body content mask belonging to the content mask.

Optionally, based on embodiments corresponding to FIG. 10, in the model training apparatus 40 provided in one embodiment of the present disclosure, the processing module 402 is specifically configured to cover, based on the human body content mask in the content mask set, the human body content mask on the image sample, and then fill the to-be-trained object back to the image sample, to obtain the to-be-trained image in the to-be-trained image set.

Optionally, based on embodiments corresponding to FIG. 10, in the model training apparatus 40 provided in one embodiment of the present disclosure, the processing module 402 is specifically configured to: generate, based on the image sample in the image sample set and according to the brief-prompt information corresponding to the to-be-trained object, K target human face key-points, the target human face key-point being in correspondence to a human face key-point, K being an integer greater than 1; generate, based on the K target human face key-points of the image sample in the image sample set, an original human face content mask by using a convex hull algorithm, the original human face content mask belonging to the content mask; generate, based on the original human face content mask of the image sample in the image sample set, an expanded human face content mask according to a mask expansion proportion, the expanded human face content mask belonging to the content mask; and generate, based on the original human face content mask of the image sample in the image sample set, a contracted human face content mask according to a mask contraction proportion, the contracted human face content mask belonging to the content mask.

Optionally, based on embodiments corresponding to FIG. 10, in the model training apparatus 40 provided in one embodiment of the present disclosure, the processing module 402 is specifically configured to: cover the expanded human face content mask on the image sample, to obtain a first mask image; extract image content of a region corresponding to the contracted human face content mask in the image sample, to obtain a second mask image; and generate, according to the first mask image and the second mask image, the to-be-trained image corresponding to the image sample.

Optionally, based on embodiments corresponding to FIG. 10, in the model training apparatus 40 provided in one embodiment of the present disclosure, the processing module 402 is specifically configured to: determine a first loss function according to the image sample in the image sample set, the predicted image corresponding to the image sample, and the to-be-trained image corresponding to the image sample; determine a second loss function according to the image sample in the image sample set and the predicted image corresponding to the image sample; determine the target loss function according to the first loss function and the second loss function; update a model parameter of the to-be-trained information synthesis model according to the target loss function; and generate, in a case that an iteration end condition is satisfied, the information synthesis model according to the model parameter of the to-be-trained information synthesis model.

Optionally, based on embodiments corresponding to FIG. 10, in the model training apparatus 40 provided in one embodiment of the present disclosure, the processing module 402 is specifically configured to calculate the target loss function in the following manner:

$$L(G, D) = E_{f,r}[L_r(G) + \lambda_s L_s(G, D)];$$

$$L_r(G) = \|m \otimes (f - G(r))\|_1$$

$$L_s(G, D) = \log(D(r, f)) + \log(1 - D(r, G(r)));$$

where L(G, D) represents the target loss function, E represents an expected value calculation, $L_r(G)$ represents the first loss function, $L_s(G, D)$ represents the second loss function, G( ) represents a generator in the to-be-trained information synthesis model, D( ) represents a discriminator in the to-be-trained information synthesis model, $\lambda_s$ represents a first preset coefficient, f represents the image sample, r represents the to-be-trained image, G(r) represents the predicted image, m represents the content mask in the to-be-trained image, and $\otimes$ represents a per-pixel multiplication.

Optionally, based on embodiments corresponding to FIG. 10, in the model training apparatus 40 according to one embodiment of the present disclosure, the image sample set includes a plurality of consecutive image samples, and the plurality of consecutive image samples are used for forming a video sample.

The processing module 402 is specifically configured to: determine a first loss function according to N frames of predicted images in the predicted image set, N frames of to-be-trained images in the to-be-trained image set, and N frames of image samples in the image sample set, N being an integer greater than 1; determine a second loss function according to N frames of predicted images in the predicted image set and N frames of image samples in the image sample set; determine the target loss function according to the first loss function and the second loss function; update a model parameter of the to-be-trained information synthesis model according to the target loss function; and generate, in a case that an iteration end condition is satisfied, the information synthesis model according to the model parameter of the to-be-trained information synthesis model.

Optionally, based on embodiments corresponding to FIG. 10, in the model training apparatus 40 provided in one embodiment of the present disclosure, the processing module 402 is specifically configured to calculate the target loss function in the following manner:

$$L(G, D) = E_{f,r}[L_r(G) + \lambda_s L_s(G, D)];$$

$$L_r(G) = \|m \otimes (f - G(o \oplus r))\|_1;$$

$$L_s(G, D) = \log(D(r, f)) + \log(1 - D(r, G(o \oplus r)));$$

where L(G, D) represents the target loss function, E represents an expected value calculation, $L_r(G)$ represents the first loss function, $L_s(G, D)$ represents the second loss function, G( ) represents a generator in the to-be-trained information synthesis model, D( ) represents a discriminator in the to-be-trained information synthesis model, $\lambda_s$ represents a first preset coefficient, O represents (N−1) frames of to-be-trained images, f represents an $N^{th}$ frame of image sample, r represents an $N^{th}$ frame of to-be-trained image, m represents a content mask of the $N^{th}$ frame of to-be-trained image, $\otimes$ represents a per-pixel multiplication, and $\oplus$ represents a superposition of image frames.

Optionally, based on embodiments corresponding to FIG. 10, in the model training apparatus 40 according to one embodiment of the present disclosure, the image sample set includes a plurality of consecutive image samples, and the plurality of consecutive image samples are used for forming a video sample.

The processing module 402 is specifically configured to: determine a first loss function according to N frames of predicted images in the predicted image set, N frames of to-be-trained images in the to-be-trained image set, and N frames of image samples in the image sample set, N being an integer greater than 1; determine a second loss function according to N frames of predicted images in the predicted image set and N frames of image samples in the image sample set; determine a third loss function according to M frames of predicted images in the predicted image set and M frames of image samples in the image sample set, M being an integer greater than or equal to 1 and less than or equal to N; determine the target loss function according to the first loss function, the second loss function, and the third loss function; update a model parameter of the to-be-trained information synthesis model according to the target loss function; and generate, in a case that an iteration end condition is satisfied, the information synthesis model according to the model parameter of the to-be-trained information synthesis model.

Optionally, based on embodiments corresponding to FIG. 10, in the model training apparatus 40 provided in one embodiment of the present disclosure, the processing module 402 is specifically configured to calculate the target loss function in the following manner:

$$L(G, D_s, D_t) = E_{f,r}[L_r(G) + \lambda_s L_s(G, D_s) + \lambda_t L_t(G, D_t)];$$

$$L_r(G) = \|m \otimes (f - G(o \oplus r))\|_1;$$

$$L_s(G, D_s) = \log(D_s(r, f)) + \log(1 - D_s(r, G(o \oplus r)));$$

$$L_t(G, D_t) = \log(D_t(r, \Delta_i(f))) + \log(1 - D_t(r, G(\Delta_i(o) \oplus (\Delta_i(r)))));$$

where $L(G, D_s, D_t)$ represents the target loss function, $L_r(G)$ represents the first loss function, $L(G, D_s)$ represents the second loss function, $L_t(G, D_t)$ represents the third loss function, G( ) represents a generator in the to-be-trained information synthesis model, G(r) represents the predicted image, $D_s($ ) represents a first discriminator in the to-be-trained information synthesis model, $D_t($ ) represents a second discriminator in the to-be-trained information synthesis model, $\lambda_s$ represents a first preset coefficient, $\lambda_t$ represents a second preset coefficient, O represents (N−1) frames of to-be-trained images, f represents an $N^{th}$ frame of image sample, r represents an $N^{th}$ frame of to-be-trained image, m represents a content mask of the $N^{th}$ frame of to-be-trained image, $A_i$ represents M frames of images generated by translating i frames forward, $\otimes$ represents a per-pixel multiplication, and $\oplus$ represents a superposition of image frames.

Figure 11:
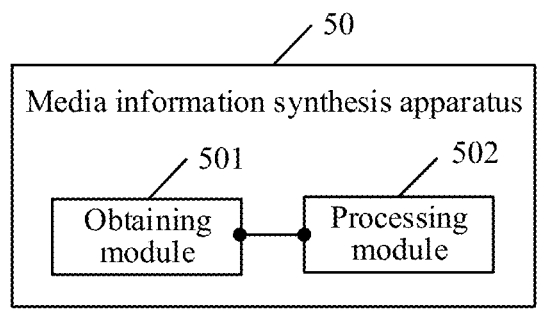
FIG. 11 is a schematic diagram of a media information synthesis apparatus according to an embodiment of the present disclosure.

An embodiment of the present disclosure further provides a media information synthesis apparatus. FIG. 11 is a schematic diagram of a model training apparatus according to an embodiment of the present disclosure. A media information synthesis apparatus 50 includes: an obtaining module 501, and a processing module 502.

The obtaining module 501 is configured to obtain a to-be-synthesized image, the to-be-synthesized image including a target object. The obtaining module 501 is further configured to obtain brief-prompt information, the brief-prompt information being used for representing key-point information of the target object in the to-be-synthesized image.

The processing module 502 is configured to obtain, based on the to-be-synthesized image and the brief-prompt information, a target image through an information synthesis model, the information synthesis model being obtained through training by adopting the method according to the first aspect. The processing module 502 is further configured to merge the target image synthesized by the processing module 502 with a background image, to obtain a synthesized image.

In one embodiment, the obtaining module 501 obtains a to-be-synthesized image, the to-be-synthesized image including a target object; the obtaining module 501 obtains brief-prompt information, the brief-prompt information being used for representing key-point information of the target object in the to-be-synthesized image; the processing module 502 obtains a target image based on the to-be-synthesized image and the brief-prompt information through an information synthesis model, the information synthesis model being obtained through training by adopting the method according to the first aspect; and the processing module 502 merges the target image synthesized by the processing module 502 with a background image, to obtain a synthesized image.

Figure 12:
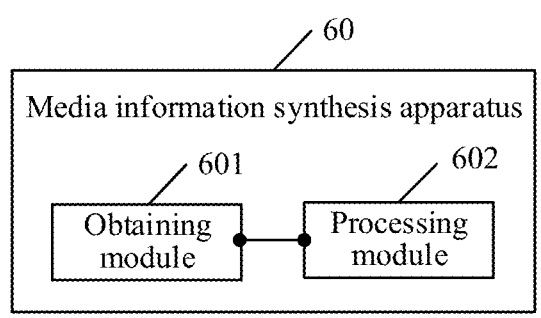
FIG. 12 is a schematic diagram of another media information synthesis apparatus according to an embodiment of the present disclosure.

An embodiment of the present disclosure further provides a media information synthesis apparatus. FIG. 12 is a schematic diagram of a model training apparatus according to an embodiment of the present disclosure. A media information synthesis apparatus 60 includes: an obtaining module 601, and a processing module 602.

The obtaining module 601 is configured to obtain a to-be-synthesized video, the to-be-synthesized video including a plurality of to-be-synthesized images, the to-be-synthesized image including a target object. The obtaining module 601 is further configured to obtain brief-prompt information, the brief-prompt information being used for representing key-point information of the target object in the to-be-synthesized image.

The processing module 602 is configured to obtain, based on the to-be-synthesized video and the brief-prompt information, a target video through an information synthesis model, the information synthesis model being obtained through training by adopting the method according to the first aspect. The processing module 602 is further configured to merge the target video synthesized by the processing module 602 with a background image, to obtain a synthesized video.

In one embodiment, the obtaining module 601 obtains a to-be-synthesized video, the to-be-synthesized video including a plurality of to-be-synthesized images, the to-be-synthesized image including a target object; the obtaining module 601 obtains brief-prompt information, the brief-prompt information being used for representing key-point information of the target object in the to-be-synthesized image; the processing module 602 obtains a target video based on the to-be-synthesized video and the brief-prompt information through an information synthesis model, the information synthesis model being obtained through training by adopting the method according to the first aspect; and the processing module 602 merges the target video synthesized by the processing module 602 with a background image, to obtain a synthesized video.

Figure 13:
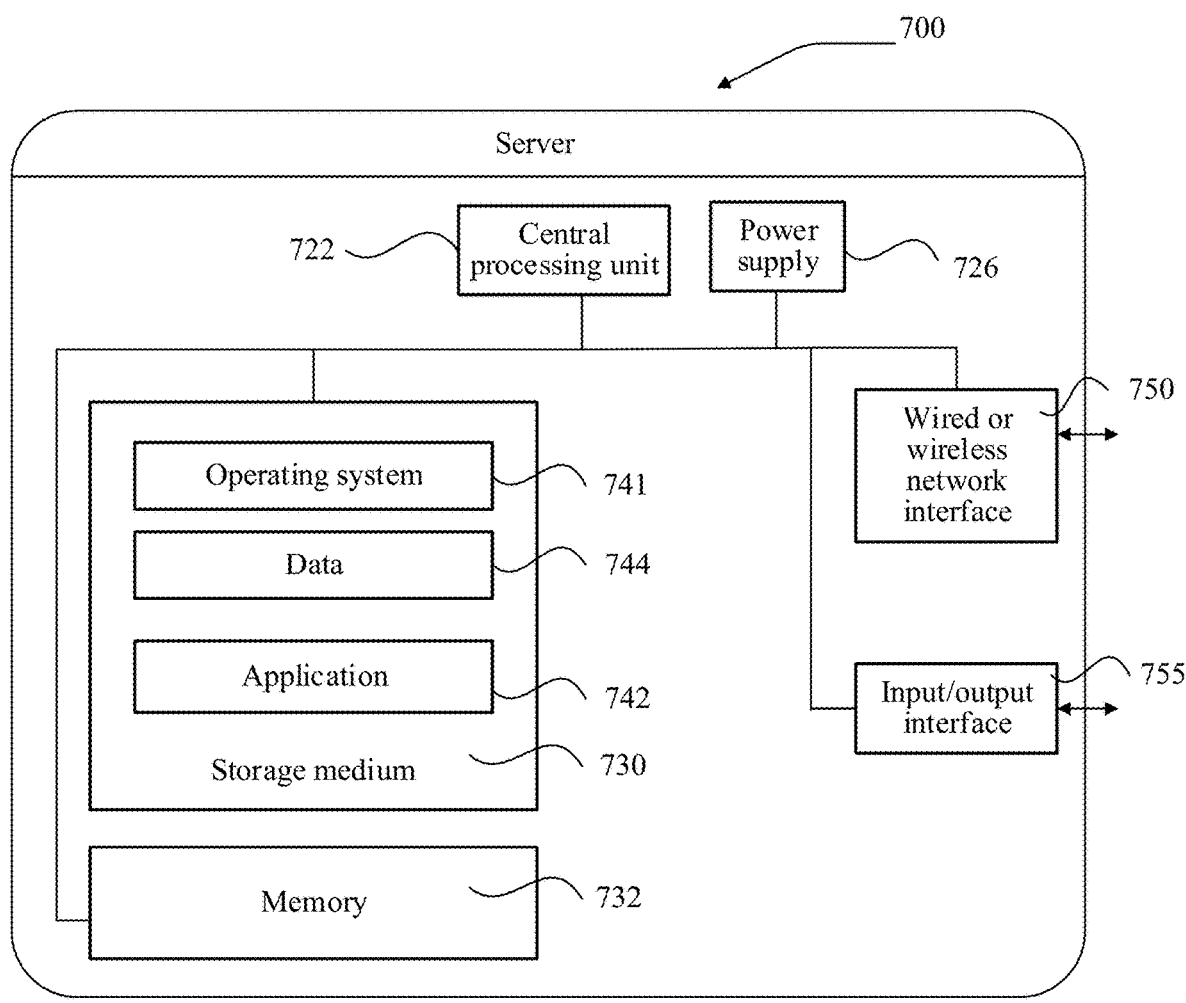
FIG. 13 is a schematic diagram of a server according to an embodiment of the present disclosure.

Then, an embodiment of the present disclosure further provides a server. FIG. 13 is a schematic structural diagram of a server according to an embodiment of the present disclosure. The model training apparatus provided in embodiments corresponding to FIG. 10 may be deployed on a server 700, and is configured to perform the steps performed by the server in the embodiments corresponding to FIG. 2 to FIG. 7C. The server 700 may vary considerably depending on configuration or performance, and may include one or more central processing units (CPU) 722 (for example, one or more processors), a memory 732, and one or more storage media 730 (for example, one or more massive storage devices) storing an application program 742 or data 744. The memory 732 and the storage medium 730 may be transient storage or persistent storage. The program stored in the storage medium 730 may include one or more modules (not marked in the figure), and each module may include a series of instruction operations to the blockchain node. Further, the CPU 722 may be configured to communicate with the storage medium 730, and execute, on the server 700, the series of instruction operations stored in the storage medium 730.

The server 700 may further include one or more power supplies 726, one or more wired or wireless network interfaces 750, one or more input/output interfaces 755, and/or one or more operating systems 741 such as Windows Server™, Mac OS X™, Unix™, Linux™, and FreeBSD™.

The steps performed by the server in the foregoing embodiment may be based on the server shown in FIG. 13. In one embodiment of the present disclosure, when the model training apparatus provided in embodiments corresponding to FIG. 10 is deployed on the server, the CPU 722 is further configured to perform the steps performed by the server in the embodiments corresponding to FIG. 2 to FIG. 7C. For a specific implementation in which the CPU 722 performs the steps performed by the server in the embodiments corresponding to FIG. 2 to FIG. 7C, reference may be made to the description in the method embodiments corresponding to FIG. 2 to FIG. 7C, which is not repeated herein.

Figure 14:
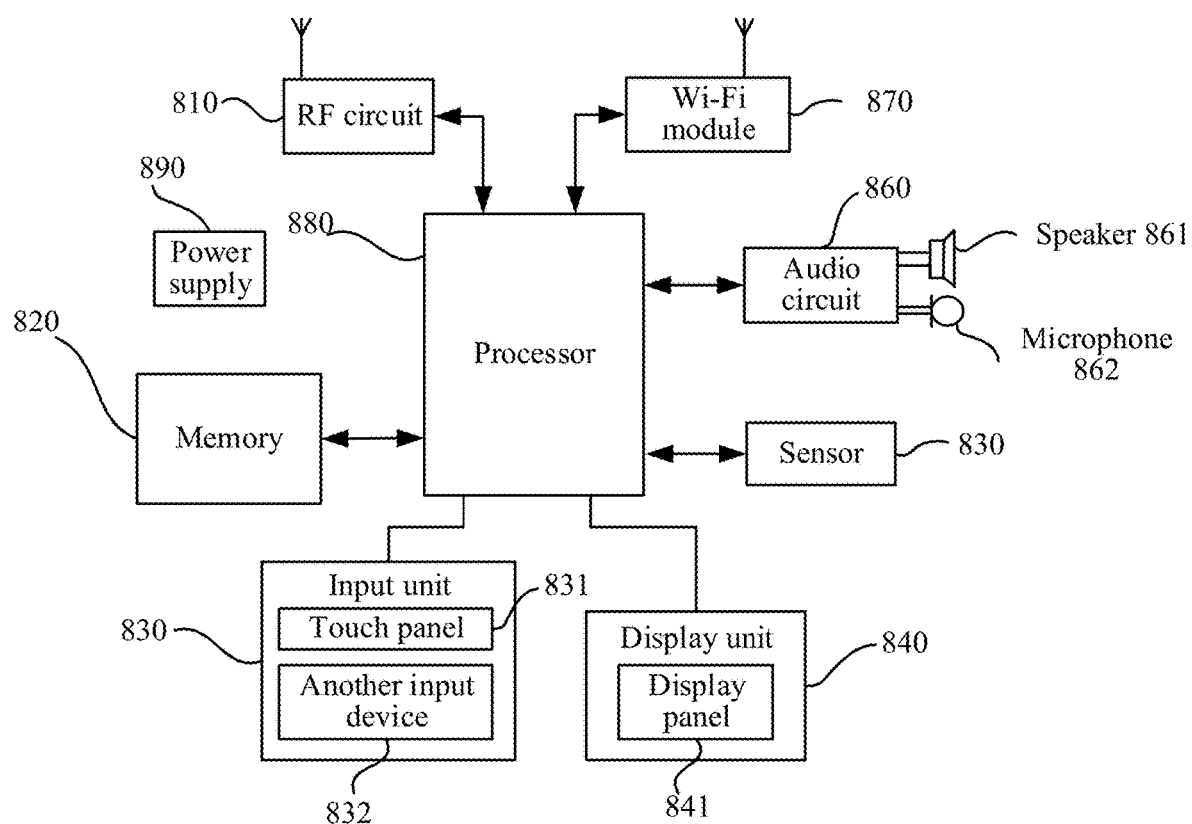
FIG. 14 is a schematic diagram of a terminal device according to an embodiment of the present disclosure.

Then, an embodiment of the present disclosure further provides a terminal device, where the media information synthesis apparatus provided in the embodiment corresponding to FIG. 11 may be deployed on a terminal device 800, and is configured to perform the steps performed by the terminal device in the embodiment corresponding to FIG. 8. Alternatively, the media information synthesis apparatus provided in the embodiment corresponding to FIG. 12 is deployed, and is configured to perform the steps performed by the terminal device in the embodiment corresponding to FIG. 9. As shown in FIG. 14, for ease of description, only parts related to the embodiments of the present disclosure are shown. For specific technical details that are not disclosed, refer to the method part in the embodiments of the present disclosure. The terminal device may be any terminal device such as a mobile phone, a tablet computer, a personal digital assistant (PDA), a point of sales (POS), an on-board computer, or the like. For example, the terminal device is a mobile phone.

FIG. 14 is a block diagram of a partial structure of the mobile phone related to the terminal device according to one embodiment of the present disclosure. Referring to FIG. 14, the mobile phone includes components such as a radio frequency (RF) circuit 810, a memory 820, an input unit 830, a display unit 840, a sensor 830, an audio circuit 860, a wireless fidelity (Wi-Fi) module 870, a processor 880, and a power supply 890. A person skilled in the art may understand that the structure of the mobile phone shown in FIG. 14 does not constitute a limitation on the mobile phone, and the mobile phone may include more components or fewer components than those shown in the figure, or some components may be combined, or a different component deployment may be used.

The following makes a specific description of components of the mobile phone with reference to FIG. 14.

The RF circuit 810 may be configured to receive and transmit a signal in an information receiving and transmitting process or a call process, and in particular, after receiving downlink information of a base station, transmit the downlink information to the processor 880 for processing. In addition, the RF circuit transmits uplink data to the base station. Generally, the RF circuit 810 includes but is not limited to an antenna, at least one amplifier, a transceiver, a coupler, a low noise amplifier (LNA), a duplexer, and the like. In addition, the RF circuit 810 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and module. The processor 880 runs the software program and module stored in the memory 820, to implement various functional applications and data processing of the mobile phone. The memory 820 may mainly include a program storage area and a data storage area. The program storage area may store an operating system, an application program required by at least one function (for example, a sound playing function and an image playing function), or the like. The data storage area may store data (for example, audio data and a phone book) created according to use of the mobile phone. In addition, the memory 820 may include a high speed random access memory, and may further include a non-volatile memory, such as at least one magnetic disk storage device, a flash memory device or other non-volatile solid state storage devices.

The input unit 830 may be configured to receive input digit or character information, and generate a keyboard signal input related to the user setting and function control of the mobile phone. Specifically, the input unit 830 may include a touch panel 831 and another input device 832. The touch panel 831 is also referred to as a touchscreen, may collect a touch operation that is performed by a user on or near the touch panel 831 (for example, an operation that is performed by a user by using any appropriate object or accessory such as a finger or a stylus on or near the touch panel 831), and drive a corresponding connection apparatus according to a preset program. Optionally, the touch panel 831 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then sends the contact coordinate to the processor 880, and can receive and execute a command sent by the processor 880. In addition, the touch panel 831 may be implemented by using various types, such as a resistive type, a capacitive type, an infrared type, and a surface acoustic wave type. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information inputted by the user or information provided for the user, and various menus of the mobile phone. The display unit 840 may include a display panel 841. Optionally, the display panel 841 may be configured in the form of a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, to determine a type of a touch event. Then, the processor 880 provides a corresponding visual output on the display panel 841 according to the type of the touch event. Although in FIG. 14, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 830 such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 860, a speaker 861, and a microphone 862 may provide audio interfaces between a user and the mobile phone. The audio circuit 860 may convert received audio data into an electrical signal and transmit the electrical signal to the speaker 861. The speaker 861 converts the electrical signal into a sound signal and outputs the sound signal. In addition, the microphone 862 converts a collected sound signal into an electrical signal. After receiving the electrical signal, the audio circuit 860 converts the electrical signal into audio data, and then outputs the audio data. After processed by the processor 880, the audio data is transmitted through the RF circuit 810 to, for example, another mobile phone or the audio data is outputted to the memory 820 for further processing.

Wi-Fi is a short distance wireless transmission technology. The mobile phone may help, by using the Wi-Fi module 870, a user to receive and transmit an email, browse a web page, access stream media, and the like. This provides wireless broadband Internet access for the user. Although FIG. 14 shows the Wi-Fi module 870, it may be understood that the Wi-Fi module is not a necessary component of the mobile phone, and the Wi-Fi module may be omitted as required provided that the scope of the essence of the present disclosure is not changed.

The processor 880 is a control center of the mobile phone, and is connected to various parts of the entire mobile phone by using various interfaces and lines. By running or executing a software program and/or module stored in the memory 820, and invoking data stored in the memory 820, the processor 880 executes various functions of the mobile phone and performs data processing, thereby monitoring the entire mobile phone. Optionally, the processor 880 may include one or more processing units. Optionally, the processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The mobile phone further includes the power supply 890 (such as a battery) for supplying power to the components. Optionally, the power supply may be logically connected to the processor 880 by using a power management system, thereby implementing functions such as charging, discharging and power consumption management by using the power management system.

Although not shown in the figure, the mobile phone may further include a camera module, a Bluetooth module, and the like, which are not further described herein.

In one embodiment of the present disclosure, when the model training apparatus provided in the embodiment corresponding to FIG. 11 is deployed on a server, the processor 880 is further configured to perform the steps performed by the server in the embodiment corresponding to FIG. 8. For a specific implementation in which the processor 880 performs the steps performed by the terminal device in the embodiment corresponding to FIG. 8, reference may be made to the description in the method embodiment corresponding to FIG. 8, which is not repeated herein.

When the model training apparatus provided in the embodiment corresponding to FIG. 12 is deployed on the server, the processor 880 is further configured to perform the steps performed by the server in the embodiment corresponding to FIG. 9. For a specific implementation in which the processor 880 performs the steps performed by the terminal device in the embodiment corresponding to FIG. 9, reference may be made to the description in the method embodiment corresponding to FIG. 9, which is not repeated herein.

An embodiment of the present disclosure further provides a computer-readable storage medium, the computer-readable storage medium storing a computer program, when run on a computer, the computer program being configured to perform the steps performed by the server in the method described in the embodiments shown in FIG. 2 to FIG. 7C; alternatively, the computer program being configured to perform the steps performed by the terminal device in the method described in the embodiment shown in FIG. 8; alternatively, the computer program being configured to perform the steps performed by the terminal device in the method described in the embodiment shown in FIG. 9.

An embodiment of the present disclosure further provides a computer program product including a program, the computer program product, when run on a computer, causing the computer to perform the steps performed by the server in the method described in the embodiments shown in FIG. 2 to FIG. 7C; alternatively, causing the computer to perform the steps performed by the terminal device in the method described in the embodiment shown in FIG. 8; alternatively, causing the computer to perform the steps performed by the terminal device in the method described in the embodiment shown in FIG. 9.

It may be clearly learned by a person skilled in the art that, for the purpose of convenient and brief description, for a detailed working process of the foregoing system, apparatus, and unit, reference may be made to a corresponding process in the foregoing method embodiments, and details are not described herein again.

According to these disclosed embodiments, image sample set and brief prompt information are obtained, the brief prompt information being used for representing key point information of a to-be-trained object in the image sample; a content mask set is generated according to the image sample set and the brief prompt information, the content mask being obtained by extending outward a region identified according to the brief prompt information in the image sample; a to-be-trained image set is generated according to the content mask set, the to-be-trained image set including at least one to-be-trained image, the to-be-trained image being in correspondence to the image sample; based on the image sample set and the to-be-trained image set, a predicted image set is obtained through a to-be-trained information synthesis model, the predicted image being in correspondence to the image sample; and based on the predicted image set and the image sample set, the to-be-trained information synthesis model is trained by using a target loss function, to obtain an information synthesis model. Through the foregoing manners, a to-be-trained image can be generated by using a content mask, and a coverage of the content mask is greater than a range of a to-be-trained object. Therefore, a part between the image content and the background can be generated by an information synthesis model by expanding the boundary appropriately, which avoids defects caused by splicing, thereby improving the reality of the synthesized video.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

In the embodiments provided in the present disclosure, it is understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art are to understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A model training method, the method comprising:
obtaining an image sample set and brief-prompt information, the image sample set comprising at least one image sample, the brief-prompt information representing key-point information of a to-be-trained object in the at least one image sample, wherein the at least one image sample includes a plurality of consecutive image samples, and the plurality of consecutive image samples are used for forming a video sample;

generating a content mask set according to the image sample set and the brief-prompt information, the content mask set comprising at least one content mask, the at least one content mask being obtained by extending outward a region identified according to the brief-prompt information in the at least one image sample;

generating a to-be-trained image set according to the content mask set, the to-be-trained image set comprising at least one to-be-trained image, the at least one to-be-trained image being in correspondence to the at least one image sample;

obtaining, based on the image sample set and the to-be-trained image set, a predicted image set through a to-be-trained information synthesis model, the predicted image set comprising at least one predicted image, the at least one predicted image being in correspondence to the at least one image sample; and training, based on the predicted image set and the image sample set, the to-be-trained information synthesis model by using a target loss function, to obtain an information synthesis model, comprising:

determining a first loss function according to N frames of predicted images in the predicted image set, N frames of to-be-trained images in the to-be-trained image set, and N frames of image samples in the image sample set, N being an integer greater than 1, wherein the first loss function is determined based on an output of a generator of the to-be-trained information synthesis model when inputting a superposition of (N-1) frames of to-be-trained images and an Nth frame of to-be-trained image to the generator;

determining a second loss function according to N frames of predicted images in the predicted image set and N frames of image samples in the image sample set;

determining the target loss function according to the first loss function and the second loss function;

iteratively updating a model parameter of the to-be-trained information synthesis model according to the target loss function; and generating, in a case that an iteration end condition is satisfied, the information synthesis model according to the model parameter of the to-be-trained information synthesis model.

2. The method according to claim 1, wherein:
the to-be-trained object is a human body object;
the obtaining an image sample set and brief-prompt information comprises:
   obtaining the image sample set; and
   obtaining the brief-prompt information corresponding to the at least one image sample in the image sample set by using a human body pose estimator method; and
the generating a content mask set according to the image sample set and the brief-prompt information comprises:
   generating, based on the at least one image sample in the image sample set and according to the brief-prompt information corresponding to the to-be-trained object, a human body key-point image;
   generating, based on the human body key-point image corresponding to the at least one image sample in the image sample set, a human body skeleton connection image; and
   generating, based on the human body skeleton connection image corresponding to the at least one image sample in the image sample set, a human body content mask by using a convex hull algorithm, the human body content mask belonging to the con at least one tent mask.

3. The method according to claim 2, wherein the generating a to-be-trained image set according to the content mask set comprises:
   covering, based on the human body content mask in the content mask set, the human body content mask on the at least one image sample, and filling the to-be-trained object back to the at least one image sample, to obtain the at least one to-be-trained image in the to-be-trained image set.

4. The method according to claim 1, wherein the generating a content mask set according to the image sample set and the brief-prompt information comprises:
   generating, based on the at least one image sample in the image sample set and according to the brief-prompt information corresponding to the to-be-trained object, K target human face key-points, each of the K target human face key-points being in correspondence to a human face key-point in the brief-prompt information, K being an integer greater than 1;
   generating, based on the K target human face key-points of the at least one image sample in the image sample set, an original human face content mask by using a convex hull algorithm;
   generating, based on the original human face content mask of the at least one image sample in the image sample set, an expanded human face content mask according to a mask expansion proportion, the expanded human face content mask belonging to the at least one content mask; and
   generating, based on the original human face content mask of the at least one image sample in the image sample set, a contracted human face content mask according to a mask contraction proportion, the contracted human face content mask belonging to the at least one content mask.

5. The method according to claim 4, wherein the generating a to-be-trained image set according to the content mask set comprises:
   covering the expanded human face content mask on a target image sample of the at least one image sample, to obtain a first mask image, wherein a region corresponding to the expanded human face content mask in the target image sample is set to a blank region;
   extracting image content of a region corresponding to the contracted human face content mask in the target image sample, to obtain a second mask image; and
   generating, by filling the second mask image into the blank region in the first mask image, one of the at least one to-be-trained image corresponding to the target image sample.

6. The method according to claim 1, wherein the determining the target loss function according to the first loss function and the second loss function comprises:
   calculating the target loss function in the following manner:

$$L(G,D)=E_{f,r}[L_r(G)+\lambda_s L_s(G,D)];$$

$$L_r(G)=\|m \otimes (f-G(r))\|_1;$$

$$L_s(G,D)=\log(D(r,f))+\log(1-D(r,G(r)));$$

wherein $L(G,D)$ represents the target loss function, E represents an expected value calculation, $L_r(G)$ represents the first loss function, $L_s(G,D)$ represents the second loss function, G( ) represents the generator in the to-be-trained information synthesis model, D( ) represents a discriminator in the to-be-trained information synthesis model, $\lambda_s$ represents a first preset coefficient, O represents the (N−1) frames of the to-be-trained images, $f$ represents an $N^{th}$ frame of image sample, r represents an $N^{th}$ frame of to-be-trained image, m represents a content mask of the $N^{th}$ frame ⊗ of to-be-trained image, & represents a per-pixel multiplication, and ⊕ represents the superposition of image frames.

7. The method according to claim 1, wherein: the training, based on the predicted image set and the image sample set, the to-be-trained information synthesis model by using a target loss function, to obtain an information synthesis model further comprises:

determining a third loss function according to M frames of predicted images in the predicted image set and M frames of image samples in the image sample set, M being an integer greater than or equal to 1 and less than or equal to N; and determining the target loss function according to the first loss function, the second loss function, and the third loss function.

8. The method according to claim 7, wherein the determining the target loss function according to the first loss function, the second loss function, and the third loss function comprises: calculating the target loss function in the following manner:

$$L(G,D_s,D_t)=E_{f,r}[L_r(G)+\lambda_s L_s(G,D_s)+\lambda_t L_t(G,D_t)];$$

$$L_r(G)=\|m\otimes(f-G(o\oplus r))\|_1;$$

$$L_s(G,D_s)=\log(D_s(r,f))+\log(1-D_s(r,G(o\oplus r)));$$

$$L_t(G,D_t)=\log(D_t(r,\Delta_i(f)))+\log(1-D_t(r,G(\Delta_i(o)\oplus(\Delta_i(r))));$$

wherein $L(G,D_s,D_t)$ represents the target loss function, $L_r(G)$ represents the first loss function, $L_s(G,D_s)$ represents the second loss function, $L_t(G,D_t)$ represents the third loss function, G( ) represents the generator in the to-be-trained information synthesis model, G(r) represents the predicted image, $D_s$( ) represents a first discriminator in the to-be-trained information synthesis model, $D_t$( ) represents a second discriminator in the to-be-trained information synthesis model, $\lambda_s$ represents a first preset coefficient, $\lambda_t$ represents a second preset coefficient, o represents the (N−1) frames of the to-be-trained images, f represents an $N^{th}$ frame of image sample, r represents an $N^{th}$ frame of to-be-trained image, m represents a content mask of the $N^{th}$ frame of to-be-trained image, $\lambda_i$ represents M frames of images generated by translating i frames forward, ⊗ represents a per-pixel multiplication, and ⊕ represents the superposition of image frames.

9. A media information synthesis method based on an information synthesis model trained using the model training method according to claim 1, comprising:

obtaining a to-be-synthesized image, the to-be-synthesized image comprising a target object;

obtaining brief-prompt information, the brief-prompt information being used for representing key-point information of the target object in the to-be-synthesized image;

obtaining, based on the to-be-synthesized image and the brief-prompt information, a target image through the information synthesis model; and merging the target image with a background image, to obtain a synthesized image.

10. A media information synthesis method based on an information synthesis model trained using the model training method according to claim 1, comprising:

obtaining a to-be-synthesized video, the to-be-synthesized video comprising a plurality of to-be-synthesized images, the plurality of to-be-synthesized images comprising a target object;

obtaining brief-prompt information, the brief-prompt information representing key-point information of the target object in the plurality of to-be-synthesized images;

obtaining, based on the to-be-synthesized video and the brief-prompt information, a target video through the information synthesis model; and merging the target video with a background image, to obtain a synthesized video.

11. A server, comprising:

a memory storing computer program instructions; and a processor coupled to the memory and, when executing the computer program instructions, configured to perform:

obtaining an image sample set and brief-prompt information, the image sample set comprising at least one image sample, the brief-prompt information being used for representing key-point information of a to-be-trained object in the at least one image sample, wherein the at least one image sample includes a plurality of consecutive image samples, and the plurality of consecutive image samples are used for forming a video sample;

generating a content mask set according to the image sample set and the brief-prompt information, the content mask set comprising at least one content mask, the at least one content mask being obtained by extending outward a region identified according to the brief-prompt information in the at least one image sample;

generating a to-be-trained image set according to the content mask set, the to-be-trained image set comprising at least one to-be-trained image, the at least one to-be-trained image being in correspondence to the at least one image sample;

obtaining, based on the image sample set and the to-be-trained image set, a predicted image set through a to-be-trained information synthesis model, the predicted image set comprising at least one predicted image, the at least one predicted image being in correspondence to the at least one image sample; and training, based on the predicted image set and the image sample set, the to-be-trained information synthesis model by using a target loss function, to obtain an information synthesis model, comprising:

determining a first loss function according to N frames of predicted images in the predicted image set, N frames of to-be-trained images in the to-be-trained image set, and N frames of image samples in the image sample set, N being an integer greater than 1, wherein the first loss function is determined based on an output of a generator of the to-be-trained information synthesis model when inputting a superposition of (N−1) frames of to-be-trained images and an $N^{th}$ frame of to-be-trained image to the generator;

determining a second loss function according to N frames of predicted images in the predicted image set and N frames of image samples in the image sample set;

determining the target loss function according to the first loss function and the second loss function;

iteratively updating a model parameter of the to-be-trained information synthesis model according to the target loss function; and generating, in a case that an iteration end condition is satisfied, the information synthesis model according to the model parameter of the to-be-trained information synthesis model.

12. The server according to claim 11, wherein:

the to-be-trained object is a human body object;

the obtaining an image sample set and brief-prompt information comprises:

obtaining the image sample set; and obtaining the brief-prompt information corresponding to the at least one image sample in the image sample set by using a human body pose estimator method; and the generating a content mask set according to the image sample set and the brief-prompt information comprises:

generating, based on the at least one image sample in the image sample set and according to the brief-prompt information corresponding to the to-be-trained object, a human body key-point image;

generating, based on the human body key-point image corresponding to the at least one image sample in the image sample set, a human body skeleton connection image; and generating, based on the human body skeleton connection image corresponding to the at least one image sample in the image sample set, a human body content mask by using a convex hull algorithm, the human body content mask belonging to the con at least one tent mask.

13. The server according to claim 12, wherein the generating a to-be-trained image set according to the content mask set comprises:

covering, based on the human body content mask in the content mask set, the human body content mask on the at least one image sample, and filling the to-be-trained object back to the at least one image sample, to obtain the at least one to-be-trained image in the to-be-trained image set.

14. The server according to claim 11, wherein the generating a content mask set according to the image sample set and the brief-prompt information comprises:

generating, based on the at least one image sample in the image sample set and according to the brief-prompt information corresponding to the to-be-trained object, K target human face key-points, each of the K target human face key-points being in correspondence to a human face key-point in the brief-prompt information, K being an integer greater than 1;

generating, based on the K target human face key-points of the at least one image sample in the image sample set, an original human face content mask by using a convex hull algorithm;

generating, based on the original human face content mask of the at least one image sample in the image sample set, an expanded human face content mask according to a mask expansion proportion, the expanded human face content mask belonging to the at least one content mask; and generating, based on the original human face content mask of the at least one image sample in the image sample set, a contracted human face content mask according to a mask contraction proportion, the contracted human face content mask belonging to the at least one content mask.

15. The server according to claim 14, wherein the generating a to-be-trained image set according to the content mask set comprises:

covering the expanded human face content mask on a target image sample of the at least one image sample, to obtain a first mask image, wherein a region corresponding to the expanded human face content mask in the target image sample is set to a blank region;

extracting image content of a region corresponding to the contracted human face content mask in the target image sample, to obtain a second mask image; and generating, by filling the second mask image into the blank region in the first mask image, one of the at least one to-be-trained image corresponding to the target image sample.

16. A non-transitory computer-readable storage medium, storing a computer program, the computer program, when being executed by at least one processor, causing the at least one processor to perform:

obtaining a to-be-synthesized video, the to-be-synthesized video comprising a plurality of to-be-synthesized images, the plurality of to-be-synthesized images comprising a target object;

obtaining target brief-prompt information, the target brief-prompt information representing key-point information of the target object in the plurality of to-be-synthesized images;

obtaining, based on the to-be-synthesized video and the target brief-prompt information, a target video through an information synthesis model; and merging the target video with a background image, to obtain a synthesized video, wherein the information synthesis model is trained by:

obtaining an image sample set and brief-prompt information, the image sample set comprising at least one image sample, the brief-prompt information representing key-point information of a to-be-trained object in the at least one image sample, wherein the at least one image sample includes a plurality of consecutive image samples, and the plurality of consecutive image samples are used for forming a video sample;

generating a content mask set according to the image sample set and the brief-prompt information, the content mask set comprising at least one content mask, the at least one content mask being obtained by extending outward a region identified according to the brief-prompt information in the at least one image sample;

generating a to-be-trained image set according to the content mask set, the to-be-trained image set comprising at least one to-be-trained image, the at least one to-be-trained image being in correspondence to the at least one image sample;

obtaining, based on the image sample set and the to-be-trained image set, a predicted image set through a to-be-trained information synthesis model, the predicted image set comprising at least one predicted image, the at least one predicted image being in correspondence to the at least one image sample; and training, based on the predicted image set and the image sample set, the to-be-trained information synthesis model by using a target loss function, to obtain an information synthesis model, comprising:

determining a first loss function according to N frames of predicted images in the predicted image set, N frames of to-be-trained images in the to-be-trained image set, and N frames of image samples in the image sample set, N being an integer greater than 1, wherein the first loss function is determined based on an output of a generator of the to-be-trained information synthesis model when inputting a superposition of (N−1) frames of to-be-trained images and an $N^{th}$ frame of to-be-trained image to the generator;

determining a second loss function according to N frames of predicted images in the predicted image set and N frames of image samples in the image sample set;

determining the target loss function according to the first loss function and the second loss function;

iteratively updating a model parameter of the to-be-trained information synthesis model according to the target loss function; and generating, in a case that an iteration end condition is satisfied, the information synthesis model according to the model parameter of the to-be-trained information synthesis model.

17. The storage medium according to claim 16, wherein:

the to-be-trained object is a human body object;

the obtaining an image sample set and brief-prompt information comprises:

obtaining the image sample set; and obtaining the brief-prompt information corresponding to the at least one image sample in the image sample set by using a human body pose estimator method; and the generating a content mask set according to the image sample set and the brief-prompt information comprises:

generating, based on the at least one image sample in the image sample set and according to the brief-prompt information corresponding to the to-be-trained object, a human body key-point image;

generating, based on the human body key-point image corresponding to the at least one image sample in the image sample set, a human body skeleton connection image; and generating, based on the human body skeleton connection image corresponding to the at least one image sample in the image sample set, a human body content mask by using a convex hull algorithm, the human body content mask belonging to the con at least one tent mask.

* * * * *